US011397796B2

(12) United States Patent
Schuler et al.

(10) Patent No.: US 11,397,796 B2
(45) Date of Patent: Jul. 26, 2022

(54) DEVICE, SYSTEM AND METHOD FOR MANAGING ACCESS AUTHORIZATIONS OF DEVICES

(71) Applicant: MOTOROLA SOLUTIONS, INC., Chicago, IL (US)

(72) Inventors: Francesca Schuler, Palatine, IL (US); Randi Karpinia, Hypoluxo, FL (US); Jorge M. Alayo Espino, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 232 days.

(21) Appl. No.: 15/921,744

(22) Filed: Mar. 15, 2018

(65) Prior Publication Data
US 2019/0286796 A1     Sep. 19, 2019

(51) Int. Cl.
| | | |
|---|---|---|
| *G06F 21/31* | (2013.01) | |
| *H04W 4/02* | (2018.01) | |
| *H04W 4/08* | (2009.01) | |
| *H04W 12/06* | (2021.01) | |
| *H04W 12/60* | (2021.01) | |

(Continued)

(52) U.S. Cl.
CPC .............. *G06F 21/31* (2013.01); *H04W 4/02* (2013.01); *H04W 4/08* (2013.01); *H04W 12/06* (2013.01); *H04W 12/084* (2021.01); *H04W 12/60* (2021.01); *H04W 4/80* (2018.02); *H04W 4/90* (2018.02)

(58) Field of Classification Search
CPC ..... G06F 21/31; H04W 12/084; H04W 12/60; H04W 12/06; H04W 4/02; H04W 4/08; H04W 4/80; H04W 4/90
See application file for complete search history.

(56) References Cited

U.S. PATENT DOCUMENTS 6,983,162 B2   1/2006 Garani et al.
7,110,745 B1 *  9/2006 Smith ................. H04M 3/4938
                                                455/411

(Continued)

FOREIGN PATENT DOCUMENTS

EP          3214570 A1    9/2017
WO     WO-2018028259 A1   2/2018

OTHER PUBLICATIONS

ISA/EP, International Search Report and Written Opinion, dated May 24, 2019; re PCT International Patent Application No. PCT/US2019/020885.

*Primary Examiner* — Jeffrey Nickerson
*Assistant Examiner* — Thanh H Le
(74) *Attorney, Agent, or Firm* — Perry + Currier, Inc.

(57) ABSTRACT

A device, system and method for managing access authorization is provided. A request to alter access authorization of one or more devices assigned to a user is received at a computing device. The computing device determines at least one contextual condition associated with at least one of the one or more devices. The computing device determines, based on the at least one contextual condition, a subset of the one or more devices for which the access authorization is to be altered to include at least one other user. The computing device alters the access authorization of the subset of the one or more devices to include the at least one other user, such that the at least one other user is granted access to the subset of the one or more devices.

18 Claims, 9 Drawing Sheets

(51) Int. Cl.
  *H04W 12/084*  (2021.01)
  *H04W 4/90*  (2018.01)
  *H04W 4/80*  (2018.01)

(56) References Cited

U.S. PATENT DOCUMENTS

| | | | | |
|---|---|---|---|---|
| 9,007,174 | B2* | 4/2015 | Cazanas | H04L 63/08 |
| | | | | 340/5.81 |
| 9,301,119 | B2* | 3/2016 | Alazraki | H04W 4/90 |
| 9,668,138 | B2* | 5/2017 | Braden | G06F 21/604 |
| 10,445,957 | B2* | 10/2019 | Savolainen | H04W 4/90 |
| 10,497,075 | B2* | 12/2019 | Chiappe | G06Q 30/04 |
| 2014/0167954 | A1* | 6/2014 | Johnson | H04W 4/029 |
| | | | | 340/539.11 |
| 2015/0312111 | A1 | 10/2015 | Blanco et al. | |
| 2016/0050118 | A1 | 2/2016 | Blanco et al. | |
| 2017/0124676 | A1 | 5/2017 | Kreitzer et al. | |
| 2017/0345238 | A1 | 11/2017 | Savolainen | |

* cited by examiner

DEVICE, SYSTEM AND METHOD FOR MANAGING ACCESS AUTHORIZATIONS OF DEVICES

BACKGROUND OF THE INVENTION

During a public safety incident, when a responder is down and/or unable to perform duties, there may be a need for a fellow responder, and the like, to access and/or activate the down responder's assigned equipment (e.g. turn on vehicle siren lights of a vehicle of the down responder, start the engine of the vehicle of the down responder, unlock the doors of the vehicle of the down responder, open window of the vehicle, turn and/or access a body worn camera, a radio, and the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
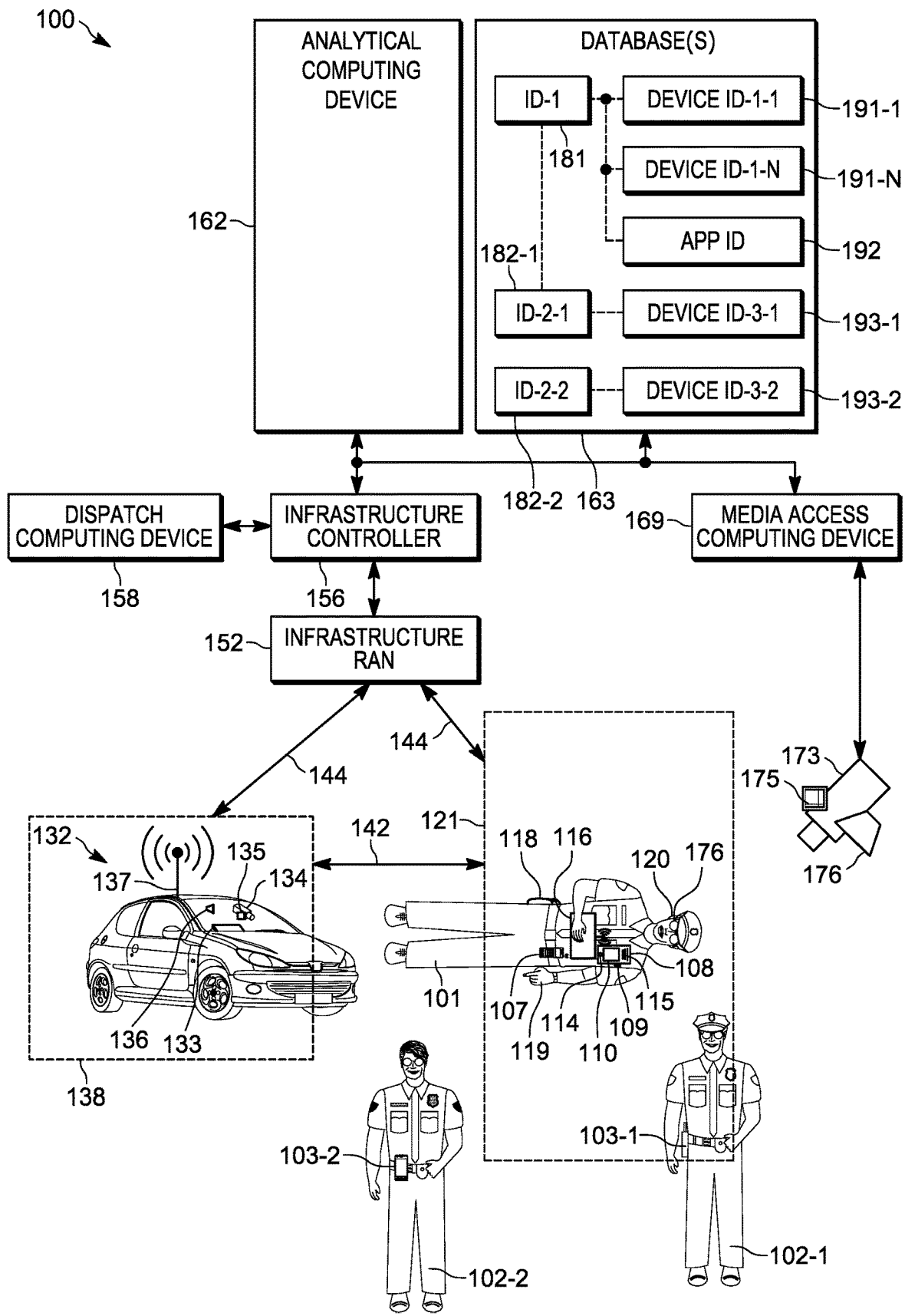
FIG. 1 is a system for managing access authorizations of devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a method for managing access authorization, the method comprising: receiving, at a computing device, a request to alter access authorization of one or more devices assigned to a user; determining, at the computing device, at least one contextual condition associated with at least one of the one or more devices; determining, at the computing device, based on the at least one contextual condition, a subset of the one or more devices for which the access authorization is to be altered to include at least one other user; and, altering, at the computing device, the access authorization of the subset of the one or more devices to include the at least one other user, such that the at least one other user is granted access to the subset of the one or more devices.

Another aspect of the specification provides a computing device for managing access authorization, the computing device comprising: a communication unit and a controller configured to: receive, using the communication unit, a request to alter access authorization of one or more devices assigned to a user; determine at least one contextual condition associated with at least one of the one or more devices; determine, based on the at least one contextual condition, a subset of the one or more devices for which the access authorization is to be altered to include at least one other user; and, alter the access authorization of the subset of the one or more devices to include the at least one other user, such that the at least one other user is granted access to the subset of the one or more devices.

Attention is directed to FIG. 1, which depicts a system 100 for managing access authorizations of devices. For example, as depicted, the system 100 may manage access authorizations of one or more devices assigned to a user 101, such as a police officer, a first responder, and the like, who, as depicted, is down and/or unable to perform duties and the like. The user 101 may or may not be able to operate the devices assigned to the user 101. In example embodiments, the system 100 may determine at least one contextual condition associated with at least one of the devices of the user 101, as described below, and alter an access authorization of a subset of the one or more devices assigned to the user 101, such that at least one other user is granted access to the subset of the one or more devices, such as one or more of users 102-1, 102-2. As will be described in further detail below, the subset of devices to which access is granted may include one or more device of a plurality of devices and/or a portion of a particular device, including, but not limited to, access to one application and/or component of the particular device, while excluding access to another application and/or component of the particular device.

The users 102-1, 102-2 will be interchangeably referred to hereafter, collectively, as the users 102 and generically as a user 102, and/or as the at least one other user 102. Furthermore, each of the users 102 carry a respective communication device 103-1, 103-2, interchangeably referred to hereafter, collectively, as the communication devices 103 and generically as a communication device 103.

As depicted, the at least one other user 102 may be at a location of the user 101 (as depicted), and may, using an associated communication device 103, request access to the one or more devices of the user 101 to assist the user 101 and/or to better assist with a public safety incident, and the like, occurring at the location. Alternatively, one or more of the at least one other users 102 may be located at a dispatch center, and the like, and request remote access to the one or more devices of the user 101 to better assist with a public safety incident, and the like, occurring at the location; for example, one of the users 102 may be a dispatcher at a dispatch center requesting access authorization to the devices of the user 101. Alternatively, one or more of the at the at least one other users 102 may request access for another user; for example, one of the users 102 may be a dispatcher at a dispatch center requesting access authorization to the devices of the user 101 for another user 102 (e.g. another police officer at the location of the user 101).

The system 100 is next described in further detail. As depicted, the system 100 includes one or more devices assigned to a user 101, for example that the user 101 may wear. The one or more devices assigned to the user 101 may include one device, such as a primary battery-powered portable radio 107 (including, but not limited to, a smartphone, and the like), used for narrowband and/or broadband direct-mode or infrastructure communications, or more than one device. Such devices may be referred to as edge devices as they are located not in the "cloud" but at the "edge" of a network and/or the "cloud. For example, an edge device may be a device which provides an entry point into a communication network and which may include, but is not limited to, phones, smartphones, radios, but also routers, routing switches, integrated access devices (IADs), multiplexers, and a variety of metropolitan area network (MAN) and wide area network (WAN) access devices. As such, the user 101 may alternatively be referred to as an operator of an edge device.

Such devices may further include, a battery-powered radio speaker microphone (RSM) video capture device 108 (which includes a push-to-talk (PTT) switch 109, a display screen 110 and a video camera 114 and a microphone 115 (which may be a component of a speaker/microphone assembly). As depicted, the one or more devices assigned to the user 101 includes a laptop 116 which may include an integrated video camera and/or microphone and/or speaker and used for data applications such as incident support applications. As depicted the one or more devices assigned to the user 101 includes smart glasses 117 (e.g. which may be virtual reality, augmented reality, or mixed reality glasses and which may include an integrated video camera and/or microphone and/or speaker), a sensor-enabled holster 118, and/or a biometric sensor wristband 119 and/or a headphone 120.

The portable radio 107, the RSM video capture device 108, the laptop 116, smart glasses 117, the sensor-enabled holster 118, and/or the biometric sensor wristband 119 and/or the headphone 120 may form a personal area network (PAN) 121 of the user 101 via corresponding short-range PAN transceivers, which may be based on a Bluetooth™, Zigbee™, WiFi or other short-range wireless protocol having a transmission range on the order of meters, tens of meters, or hundreds of meters.

While not depicted, the personal area network 121 may include other types of devices that include sensors, such as a man-down sensor and/or a sensor equipped vest worn by the user 101 which may be configured to detect when the vest is impacted and/or pierced.

Although FIG. 1 illustrates the user 101 with a respective one or more devices assigned to the user 101, in other embodiments, the user 101 may include additional sets of same or similar devices, and additional persons and/or first responders may be present, such as the at least one other user 102, with respective additional sets of same or similar devices (wherein communication devices of the user 101 and the at least one other user 102 may form a talkgroup of related users). For example, as depicted, the at least one other user 102 has been assigned a communication device 103 which may be similar to the portable radio 107 and/or a smartphone, and the like.

Furthermore, as depicted the device 103-1 of the user 102-1 is also part of the PAN 121; for example, the users 101, 102-1 may be partners and the devices assigned to each of the users 101, 102-1 communicate in the PAN 121, with one of the devices, such as the portable radio 107, acting as the hub device of the PAN 121, for example to manage the devices of the PAN, for example using a dynamic equipment application, and the like.

The system 100 may also include a vehicle 132 associated with the user 101 having an integrated mobile communication device 133, an associated vehicular video camera 134, and/or an associated microphone 135 (which may be a component of the video camera 134 or a component separate from the video camera 134), a speaker 136 and a coupled vehicular transceiver 137 which may form a vehicle area network (VAN) 138. The devices of the VAN 138 may also be assigned to the user 101 and/or the user 102-1 and furthermore the VAN 138 may be a component of the PAN 121. Other components of the VAN 138 may include, but are not limited to, an ignition of the vehicle 132, locks of the vehicle 132, and the like.

Although FIG. 1 illustrates only a single vehicle 132 with a single mobile communication device 133, respective single vehicular video camera 134 and/or microphone 135, and single coupled vehicular transceiver 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 107, the RSM video capture device 108, the laptop 116, and/or the PAN 121 and the vehicular mobile communication device 133 and/or the VAN 138 may be configured for directly wirelessly communicating via direct-mode wireless link(s) 142, and/or may be configured for wirelessly communicating over respective wireless link(s) 144 via a wireless infrastructure radio access network (RAN) 152 (described in more detail below) and via corresponding transceiver circuits. These devices may be referred to as communication devices and are configured to receive inputs associated with the user 101 and/or provide outputs to the user 101 in addition to communicating information to and from other communication devices and the infrastructure RAN 152.

While links between the devices 103 and the infrastructure RAN 152 are not depicted, they are understood by one skilled in the art to be present.

The portable radio 107, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth™ Zigbee™, or NFC (near field communication) transmitter) with other communication devices and/or an infrastructure RAN. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

In the example of FIG. 1, the portable radio 107 may form the hub of communication connectivity for the user 101, through which other accessory devices, such as a biometric sensor (for example, the biometric sensor wristband 119), an activity tracker, a weapon status sensor (for example, the sensor-enabled holster 118), a heads-up-display (for example, the smart glasses 117), the RSM video capture device 108, and/or the laptop 116 and/or the headphone 120 may be communicatively coupled. In other words, the portable radio 107 may form the hub of the PAN 121.

In order to communicate with and exchange video, audio, and other media and communications with the RSM video capture device 108, laptop 116, and/or smart glasses 117 and/or headphone 120, the portable radio 107 may contain one or more physical electronic ports (such as a USB (Universal Serial Bus) port, an Ethernet port, an audio jack, etc.) for direct electronic coupling with the RSM video capture device 108, laptop 116, and/or smart glasses 117 and/or headphone 120. In some embodiments, the portable radio 107 may contain a short-range transmitter (i.e., short-range in comparison to the long-range transmitter such as a LMR or broadband transmitter) and/or transceiver for wirelessly coupling with the RSM video capture device 108, laptop 116, and/or smart glasses 117 and/or headphone 120. The short-range transmitter may be a Bluetooth™, Zigbee™, or NFC transmitter having a transmit range on the order of 0.01-100 meters, or 0.1-10 meters. In other embodiments, the RSM video capture device 108, the laptop 116, and/or the smart glasses 117 and/or headphone 120 may contain their own long-range transceivers and may communicate with one another and/or with the infrastructure RAN 152 or vehicular transceiver 137 directly without passing through portable radio 107.

The RSM video capture device 108 provides voice functionality features similar to a traditional RSM, including one or more of acting as a remote microphone (e.g. via the microphone 115) that is closer to the mouth of the user 101, providing a remote speaker (e.g. integrated with the microphone 115) allowing playback of audio closer to the ear of the user 101, and including the PTT switch 109 or other type of PTT input. The voice and/or audio recorded at the remote microphone 115 may be provided to the portable radio 107 for storage and/or analysis or for further transmission to other mobile communication devices or the infrastructure RAN 152, or may be directly transmitted by the RSM video capture device 108 to other communication devices or to the infrastructure RAN 152. The voice and/or audio played back at the remote speaker may be received from the portable radio 107 or received directly from one or more other communication devices or the infrastructure RAN 152. The RSM video capture device 108 may include the separate physical PTT switch 109 that functions, in cooperation with the portable radio 107 or on its own, to maintain the portable radio 107 and/or RSM video capture device 108 in a monitor only mode, and which switches the device(s) to a transmit-only mode (for half-duplex devices) or transmit and receive mode (for full-duplex devices) upon depression or activation of the PTT switch 109. The portable radio 107 and/or RSM video capture device 108 may form part of a group communications architecture that allows a single communication device to communicate with one or more group members (i.e., talkgroup members not shown in FIG. 1) associated with a particular group of devices at a same time.

Additional features may be provided at the RSM video capture device 108 as well. For example, as depicted, the display screen 110 may be provided for displaying images, video, and/or text to the user 101 or to someone else. The display screen 110 may be, for example, a liquid crystal display (LCD) screen or an organic light emitting display (OLED) display screen, and the like. In some embodiments, a touch sensitive input interface may be incorporated into the display screen 110 as well, allowing the user 101 to interact with content provided on the display screen 110. However, the display screen 110 may be optional. A soft PTT input may also be provided, for example, via such a touch interface.

The video camera 114 may also be provided at the RSM video capture device 108, integrating an ability to capture images and/or video and store the captured image data (for further analysis) or transmit the captured image data as an image or video stream to the portable radio 107 and/or to other communication devices or to the infrastructure RAN 152 directly. The video camera 114 and RSM remote microphone 115 may be used, for example, for capturing audio and/or video of a field-of-view associated with the user 101, which may include the at least one other user 102 and/or surroundings of a at least one other user 102, storing the captured image and/or audio data for further analysis or transmitting the captured audio and/or video data as an audio and/or vide stream to the portable radio 107 and/or to other communication devices or to the infrastructure RAN 152 directly for further analysis. The microphone 115 of the RSM video capture device 108 may be an omni-directional or unidirectional microphone or array of omni-directional or unidirectional microphones that may configured for identifying a direction from which a captured sound emanated.

In some embodiments, the RSM video capture device 108 may be replaced with a more limited body worn camera that may include the video camera 114 and/or microphone 115 noted above for capturing audio and/or video, but may forego one or more of the features noted above that transform the body worn camera into a more full featured RSM, such as the separate physical PTT switch 109 and the display screen 110, remote microphone functionality for voice communications in cooperation with portable radio 107, and remote speaker.

The laptop 116, in particular, may be any wireless communication device used for infrastructure RAN or direct-mode media communication via a long-range or short-range wireless transmitter with other communication devices and/or the infrastructure RAN 152. The laptop 116 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 116 display screen may be, for example, an LCD screen or an OLED display screen, and the like. In some embodiments, a touch sensitive input interface may be incorporated into the display screen as well, allowing the user 101 to interact with content provided on the display screen. A soft PTT input may also be provided, for example, via such a touch interface. However, the laptop 116 may be optional as carrying a laptop during a public safety incident may be challenging for the user 101.

Front and/or rear-facing video cameras (not depicted), as well as one or more microphones) may also be provided at the laptop 116, integrating an ability to capture video and/or audio of the user 101 and surroundings, which may include a field-of-view of the user 101 and/or a suspect (or potential suspect, such as the at least one other user 102) and the suspect's surroundings, and store and/or otherwise process the captured video and/or audio for further analysis or transmit the captured video and/or audio as a video and/or audio stream to the portable radio 107, other communication devices, and/or the infrastructure RAN 152 for further analysis.

The headphone 120 may comprise an in-ear or over-the ear earpiece and may be present for providing audio to the user 101 in a private fashion that is not accessible to other users nearby the user 101. The headphone 120 may be wiredly or wirelessly communicatively coupled to one or both of the RSM video capture device 108 and the portable radio 107, which may be configured to provide audio received from the infrastructure RAN 152 and/or from other users to the user 101 based on a manual configuration of the RSM video capture device 108 or the portable radio 107, or based on some automatic routing mechanism at the one of the RSM video capture device 108 and the portable radio 107 that may route all audio to the earpiece or headphone 120 whenever it is detected as connected to the one of the RSM video capture device 108 and the portable radio 107, or may selectively route audio received at the one of the RSM video capture device 108 and the portable radio 107 to the earpiece or headphone 120 based on various contextual parameters, such as a content of the received audio, an identity of who sent the received audio, a covert status of the user 101, an incident status of the user 101, a determination of nearby users associated with the user 101, or some other contextual parameter.

The smart glasses 117 may include a digital imaging device, an electronic processor, a short-range and/or long-range transceiver device, and/or a projecting device and/or one or more microphones. The smart glasses 117 may maintain a bi-directional connection with the portable radio 107 and provide an always-on or on-demand video feed pointed in a direction of a gaze of the user 101 via the digital imaging device, and/or may provide a personal display via the projection device integrated into the smart glasses 117 for displaying information such as text, images, or video received from the portable radio 107 or directly from the infrastructure RAN 152. In some embodiments, the smart glasses 117 may include its own long-range transceiver and may communicate with other communication devices and/or with the infrastructure RAN 152 or vehicular transceiver 137 directly without passing through portable radio 107. In other embodiments, an additional user interface mechanism such as a touch interface or gesture detection mechanism may be provided at the smart glasses 117 that allows the user 101 to interact with the display elements displayed on the smart glasses 117 or projected into the eyes of the user 101, or to modify operation of the digital imaging device. In still other embodiments, a display and input interface at the portable radio 107 may be provided for interacting with smart glasses 117 content and modifying operation of the digital imaging device, among other possibilities.

The smart glasses 117 may provide a virtual reality interface in which a computer-simulated reality electronically replicates an environment with which the user 101 may interact. In some embodiments, the smart glasses 117 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 117 may provide a mixed reality interface in which electronically generated objects are inserted in a direct or indirect view of real-world environments in a manner such that they may co-exist and interact in real time with the real-world environment and real-world objects.

The sensor-enabled holster 118 may be an active (powered) or passive (non-powered) sensor that maintains and/or provides state information regarding a weapon or other item normally disposed within the sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 107 via its short-range transceiver. In some embodiments, the sensor-enabled holster 118 may also detect whether the first responder's hand is resting on the weapon even if it has not yet been removed from the holster and provide such information to portable radio 107. Other possibilities exist as well.

The biometric sensor wristband 119 may be an electronic device for tracking an activity of the user 101 or a health contextual condition of the user 101, and may include one or more movement sensors (such as an accelerometer, magnetometer, and/or gyroscope) that may periodically or intermittently provide to the portable radio 107 indications of orientation, direction, steps, acceleration, and/or speed, and indications of health such as one or more of a captured heart rate, a captured breathing rate, and a captured body temperature of the user 101, which may accompany other information. In some embodiments, the biometric sensor wristband 119 may include its own long-range transceiver and may communicate with other communication devices and/or with the infrastructure RAN 152 or vehicular transceiver 137 directly without passing through portable radio 107.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 119 itself, or disposed separately and communicate with the sensor wristband 119 via a short-range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short-range wireless connection, among other possibilities.

Although the biometric sensor wristband 119 is shown in FIG. 1 as a bracelet worn around the wrist, in other examples, the biometric sensor wristband 119 may additionally and/or alternatively be worn around another part of the body, or may take a different physical form including an earring, a finger ring, a necklace, a glove, a belt, or some other type of wearable, ingestible, or insertable form factor.

The portable radio 107 and/or RSM video capture device 108 (or any other electronic device in FIG. 1, for that matter) may each include a location determination device integrated with or separately disposed in the portable radio 107 and/or RSM video capture device 108 and/or in respective receivers, transmitters, or transceivers of the portable radio 107 and RSM video capture device 108 for determining a location of the portable radio 107 and RSM video capture device 108. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 101 may include the mobile communication device 133, the vehicular video camera 134 and/or microphone 135, and the vehicular transceiver 137, all of which may be coupled to one another via a wired and/or wireless VAN 138 (and/or with any other further sensors physically or communicatively coupled to the vehicle 132). The vehicular transceiver 137 may include a long-range transceiver for directly wirelessly communicating with communication devices such as the portable radio 107, the RSM video capture device 108, and the laptop 116 via wireless link(s) 142 and/or for wirelessly communicating with the RAN via wireless link(s) 144. The vehicular transceiver 137 may further include a short-range wireless transceiver or wired transceiver for communicatively coupling between the mobile communication device 133 and/or the vehicular video camera 134 and/or the microphone 135 in the VAN 138. The mobile communication device 133 may, in some embodiments, include the vehicular transceiver 137 and/or the vehicular video camera 134 and/or the microphone 135 integrated therewith, and may operate to store and/or process video and/or audio produced by the video camera 134 and/or transmit the captured video and/or audio as a video and/or audio stream to the portable radio 107, other communication devices, and/or an infrastructure RAN 152 (described below) for further analysis. The microphone 135 may comprise an omni-directional or unidirectional microphone 135, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 137 for capturing audio and storing, processing, and/or transmitting the audio in a same or similar manner as set forth above with respect to the RSM video capture device 108.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the speaker 136 as being placed inside of the vehicle 132 and coupled to the mobile communication device 133, in other embodiments, multiple speakers may be provided inside and/or outside of the vehicle 132 (all addressed simultaneously or individually addressable for outputting separate audio streams), or the single speaker 136 may be placed outside of the vehicle and function as a PA (public address) speaker, among other possibilities.

The vehicle 132 may be a human-operable vehicle, or may be a self-driving vehicle operable under control of mobile communication device 133 and optionally in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN 138 and/or the PAN (when the PAN is in range of the VAN 138 or via infrastructure RAN link of the VAN 138).

The vehicle 132 and/or transceiver 137, similar to the portable radio 107 and/or respective receivers, transmitters, or transceivers thereof, may include a location (and/or orientation) determination device integrated with or separately disposed in the mobile communication device 133 and/or transceiver 137 for determining (and storing and/or transmitting) a location (and/or orientation) of the vehicle 132.

In some embodiments, instead of a vehicle 132, a land, air, or water-based drone and/or self-driving vehicle and/or self-navigating vehicle and/or autonomous vehicle and/or robotic device, and the like, with the same or similar audio and/or video and communications capabilities and the same or similar self-navigating capabilities as set forth above may be disposed, and may similarly communicate with the PAN 121 and/or with the infrastructure RAN 152 to support the user 101 in the field.

The VAN 138 may communicatively couple with the PAN 121, disclosed above, when the VAN 138 and the PAN 121 come within wireless transmission range of one another, which may include an authentication that takes place there between. In some embodiments, one of the VAN 138 and the PAN 121 may provide infrastructure communications to the other, depending on the situation and the types of devices in the VAN 138 and/or PAN 121 and may provide interoperability and communication links between devices (such as video cameras and sensors) within the VAN 138 and PAN 121.

The infrastructure RAN 152 comprises a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such an infrastructure RAN typically includes a system infrastructure that generally includes a network of various fixed terminals, such as antennas and the like, which are in direct radio communication with the communication devices. Each of the fixed terminals operating in the RAN may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN are made via respective serving fixed terminals. Sites of neighboring fixed terminals may be offset from one another and may provide corresponding non-overlapping or partially or fully overlapping RF coverage areas.

The infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally, or alternatively, the infrastructure RAN 152 may implement a WLAN technology such as Wi-Fi, for example operating in accordance with an IEEE 802.11 standard (e.g., 802.11a, 802.11b, 802.11g) or such as a WiMAX, for example operating in accordance with an IEEE 802.16 standard.

The infrastructure RAN 152 may additionally, or alternatively, operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (for example, at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) for example based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in the infrastructure RAN 152, at the infrastructure controller 156 or at a separate cloud computing cluster (not depicted) communicably coupled to the infrastructure controller 156 via an internet protocol (IP) network (not depicted), among other possibilities.

The infrastructure RAN 152 is illustrated in FIG. 1 as providing coverage for the PAN 121 and/or the portable radio 107, the RSM video capture device 108, the laptop 116, the smart glasses 117, and/or the vehicle transceiver 137 and/or the VAN 138. In general, the infrastructure RAN 152 communicatively couples the PAN 121 and/or the portable radio 107, the RSM video capture device 108, the laptop 116, the smart glasses 117, and/or the vehicle transceiver 137 and/or the VAN 138 to a single infrastructure controller 156, which is in turn in communication with a dispatch computing device 158 which include one or more dispatch terminals operated by one or more dispatchers. The infrastructure controller 156 further couples the PAN 121 and/or the portable radio 107, the RSM video capture device 108, the laptop 116, the smart glasses 117, and/or the vehicle transceiver 137 and/or the VAN 138 to an analytical computing device 162, for example via an internet protocol (IP) network (not depicted), and the like.

For example, infrastructure RAN 152 may include one or more fixed antennas, fixed terminals, and the like (not depicted) which couple the infrastructure RAN 152 to the infrastructure controller 156 (e.g., a radio controller, call controller, PTT server, zone controller, MME, BSC, MSC, site controller, Push-to-Talk controller, or other network device) the dispatch computing device 158 and the analytical computing device 162. In other embodiments, a plurality of fixed antennas and/or terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device consistent with the remainder of this disclosure.

It is understood by one skilled in the art d in FIG. 1 that an IP network is present which couples the infrastructure controller 156 to the analytical computing device 162, as well as one or more database 163 and/or a media access computing device 169 described in more detail below. Such an IP network may comprise one or more routers, switches, LANs, WLANs, WANs, access points, or other network infrastructure, including but not limited to, the public Internet.

The analytical computing device 162 may comprise of a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and inter-connected via electronic and/or optical interconnects. Although not shown in FIG. 1, one or more proxy servers or load balancing servers may control which one or more computing devices perform any part or all of the electronic digital assistant service.

As depicted, the system 100 may further comprise the one or more databases 163 which may be accessible via an IP network and/or the analytical computing device 162, and may include databases such as a long-term video storage database, a historical or forecasted weather database, an offender database which may include, but is not limited to, facial recognition images to match against, a cartographic database of streets and elevations, a traffic database of historical or current traffic conditions, or other types of databases. The one or more databases 163 may further include all or a portion of the databases described herein as being provided at infrastructure controller 156. In some embodiments, the one or more databases 163 may be maintained by third parties (for example, the National Weather Service or a Department of Transportation, respectively). As shown in FIG. 1, the one or more databases 163 may be communicatively coupled with the infrastructure RAN 152 (e.g. via an IP network) to allow communication devices (for example, the portable radio 107, the RSM video capture device 108, the laptop 116, and the mobile communication device 133) to communicate with and retrieve data from the one or more databases 163 via the infrastructure controller 156. In some embodiments, the one or more databases 163 are commercial cloud-based storage devices. In some embodiments, the one or more databases 163 are housed on suitable on-premises database servers. The one or more databases 163 of FIG. 1 are merely examples. In some embodiments, the system 100 additionally or alternatively includes other databases that store different information. In some embodiments, the one or more databases 163 disclosed herein and/or additional or other databases are integrated with, or internal to, the infrastructure controller 156.

In some embodiments, the one or more databases 163 may further comprise a database of one or more of: devices of a user 101, 102 to which access authorization has been granted; respective locations of the users 101, 102 and/or the one or more assigned devices (e.g. assuming that the system 100 tracks their respective locations via, for example, GPS tracking); incidents to which the users 101, 102 are assigned; presence of the users 101, 102; respective roles of the users 101, 102 (e.g. in an organization chart and/or hierarchy); jurisdictions associated with the users 101, 102; and the like.

In particular, as depicted, the one or more databases 163 include respective identifiers 181 (labelled as "ID-1"), 182-1, 182-2 (and labelled as "ID-2-1", "ID-2-2") of the users 101, 102-1, 102-2 and which may include, but are not limited to, badge numbers, employee numbers and the like. The identifiers 182-1, 182-2 are interchangeably referred to hereafter, collectively, as the identifiers 182 and, generically, as an identifier 182.

The one or more databases 163 further includes identifiers of devices and/or applications of devices of the PAN 121 and/or the VAN 138 to which access authorization has been granted to the user 101; for example, the devices of the PAN 121 and/or the VAN 138 are identified by device identifiers 191-1, . . . 191-N (e.g. assuming that "N" is an integer number and that there are "N" devices in the PAN 121 and/or the VAN 138), and an application of the PAN 121 and/or the VAN 138, such as incident management application being implemented at the portable radio 107 and/or the mobile communication device 133, is identified by an application identifier 192. The device identifiers 191-1, . . . 191-N are interchangeably referred to hereafter, collectively, as the device identifiers 191 and, generically, as a device identifier 191. Access authorization is represented by dashed lines between the identifier 181 and the identifiers 191, 192.

Such access authorization may be granted to the user 101, for example by the dispatch computing device 158, and the like, implementing a resource management application. As such, the dispatch computing device 158 may alternatively be referred to as a resource management computing device. For example when the user 101 signs into the dispatch computing device 158 and/or the resource management application, and the like at the beginning of a shift, and/or when the user 101 signs out the devices of the PAN 121 and/or the VAN 138, the dispatch computing device 158 and/or the resource management application may grant access authorization to the user 101 for the devices of the PAN 121 and/or the VAN 138.

The device identifiers 191 and/or the application identifier 192 may each comprise an alphanumeric code, such as an inventory code and the like, assigned to each of the devices and/or applications of the PAN 121 and/or the VAN 138.

Similarly, one or more databases 163 further includes identifiers of devices 103 and/or applications of devices 103 to which access authorization has been granted to the users 102; for example, access authorization to the device 103-1, identified by the device identifier 193-1, has been granted to the user 102-1, identified by the identifier 182-1, and access authorization to the device 103-2, identified by the device identifier 193-2, has been granted to the user 102-2, identified by the identifier 182-2. While the one or more databases 163 do not show access authorization granted for applications at the devices 103, such access authorization may nonetheless may have been granted.

As further depicted in FIG. 1, the one or more databases 163 further stores an association (e.g. a dotted line) between the identifiers 181, 182-1 as devices of each of the associated users 101, 102-1 are in the PAN 121.

While not depicted, each of the identifiers 181, 182 may be associated with one or more of a respective role, jurisdiction, location, incident assignments and the like, of the users 101, 102.

Furthermore, the access authorizations of devices at the PAN 121 and/or the VAN 138, and/or associations between identifiers 181, 182-1, depicted as being stored at the one or more databases 163 in FIG. 1, may be stored at a memory of a device of the PAN 121 and/or the VAN 138, and in particular a memory of a hub device, such as the portable radio 107. Alternatively, the hub device may have access to the databases 163 such that the hub device has access to authorizations of devices at the PAN 121 and/or the VAN 138.

Furthermore, one or more of a hub device of the PAN 121 and/or the VAN 138, such as the portable radio 107, the dispatch computing device 158 and the analytical computing device 162 may be authorized to access the one or more databases 163 and alter the access authorizations.

Although the RSM video capture device 108, the laptop 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

For example, as depicted, the system 100 further comprises the media access computing device 169 that may be a component of the analytical computing device 162 and/or the dispatch computing device and/or a component of the cloud compute cluster arrangement of the analytical computing device 162 and/or a standalone computing device. Either way, the media access computing device 169 is in communication with the analytical computing device 162 and/or the devices of the PAN 121 and/or the VAN 138, for example via an IP network.

The media access computing device 169 is further configured to communicate with at least one camera 173 (e.g. a closed-circuit television (CCTV) camera, a video camera, and the like) at the location of the user 101 and/or the at least one other user 102, as well as at least one optional microphone 175 and/or an optional speaker 176, which may also be edge devices. The optional microphone 175 and/or the optional speaker 176 may be components of the at least one camera 173 (e.g. as depicted) and/or may be separate from the at least one camera 173. Furthermore, the at least one camera 173 (and/or the microphone 175 and/or the speaker 176) may be a component of a public safety monitoring system and/or may be a component of a commercial monitoring and/or private security system to which the computing device 169 has been provided access. The camera 173 and/or the microphone 175 generally generate one or more of video data, audio data and multimedia data associated with the location of the user 101 and/or the at least one other user 102; for example, the camera 173 may be positioned to generate video data of the location of the user 101 and/or the at least one other user 102, and the microphone 175 may be positioned to generate audio data of the location of the user 101 and/or the at least one other user 102, such as voices of the user 101 and/or the at least one other user 102. Such video data and/or audio data may be used to determine a contextual condition of the users 101, 102, for example to confirm their location and/or to confirm that the user 101 is down, and the like. The speaker 176 may be controlled to provide alerts and/or notifications and/or announcements.

Although FIG. 1 describes a communication system 100 generally as a public safety communication system that includes a user 101 generally described as a police officer and a vehicle 132 generally described as a police car or cruiser, in other embodiments, the communication system 100 may additionally or alternatively be a retail communication system including a user that may be an employee of a retailer and a vehicle 132 that may be a vehicle for use by the user 101 in furtherance of the employee's retail duties (e.g., a shuttle or self-balancing scooter). In other embodiments, the communication system 100 may additionally or alternatively be a warehouse communication system including a user 101 that may be an employee of a warehouse and a vehicle 132 that may be a vehicle for use by the user 101 in furtherance of the employee's retail duties (e.g., a forklift). In still further embodiments, the communication system 100 may additionally or alternatively be a private security communication system including a user 101 that may be an employee of a private security company and a vehicle 132 that may be a vehicle for use by the user 101 in furtherance of the private security employee's duties (e.g., a private security vehicle or motorcycle). In even further embodiments, the communication system 100 may additionally or alternatively be a medical communication system including a user 101 that may be a doctor or nurse of a hospital and a vehicle 132 that may be a vehicle for use by the user 101 in furtherance of the doctor or nurse's duties (e.g., a medical gurney or ambulance). In still another example embodiment, the communication system 100 may additionally or alternatively be a heavy machinery communication system including a user 101 that may be a miner, driller, or extractor at a mine, oil field, or precious metal or gem field and a vehicle 132 that may be a vehicle for use by the user 101 in furtherance of the miner, driller, or extractor's duties (e.g., an excavator, bulldozer, crane, front loader). As one other example, the communication system 100 may additionally or alternatively be a transportation logistics communication system including a user 101 that may be a bus driver or semi-truck driver at a school or transportation company and a vehicle 132 that may be a vehicle for use by the user 101 in furtherance of the driver's duties. However, it is understood by a person skilled in the art, that these are just examples and any other appropriate scenario is within the scope of the specification.

In the examples of the user 101 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

One or more devices of the system 100 may be generally configured to perform video and/or audio analytics on video data and/or audio data and/or multimedia data received from one or more of the video camera 114, the microphone 115, the laptop 116, the smart glasses 117, the video camera 134, the microphone 135, the at least one camera 173 and/or the microphone 175.

Such video and/or audio analytics may be performed using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments.

Figure 2:
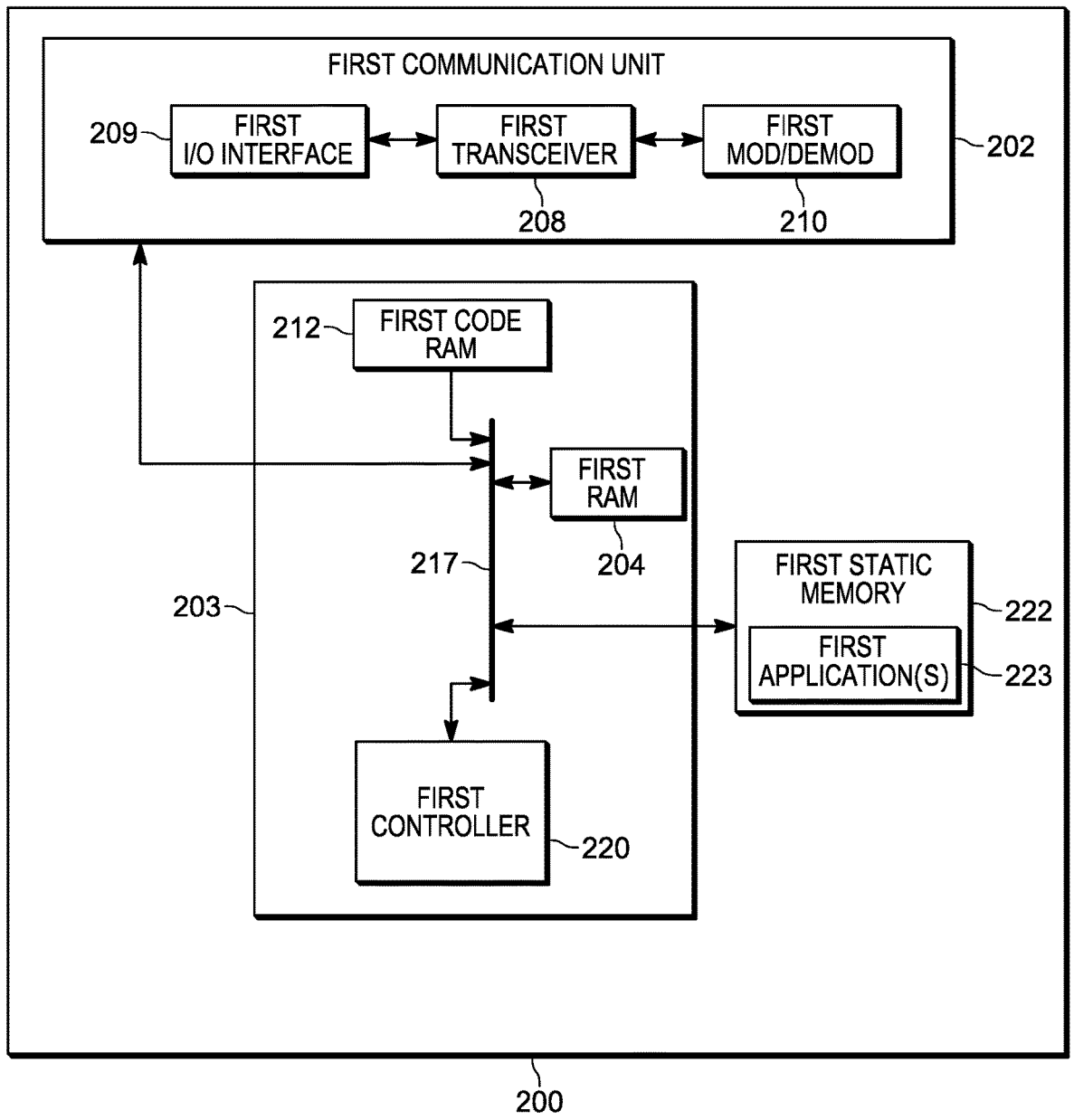
FIG. 2 is a device diagram showing a device structure of a computing device for managing access authorizations of devices in accordance with some embodiments.

Attention is next directed to FIG. 2 which depicts which sets forth a schematic diagram of a first example device 200 that may include, but is not limited to, one or more of the the analytical computing device 162, the infrastructure controller 156, the dispatch computing device 158, the media access device 169, and the like. For example, the configuration of the analytical computing device 162 may generally be similar to the configuration of the example device 200.

Hence, as depicted in FIG. 2, the device 200 generally includes a first communications unit 202, a first processing unit 203, a first Random-Access Memory (RAM) 204, one or more first wireless transceivers 208, one or more first wired and/or wireless input/output (I/O) interfaces 209, a first combined modulator/demodulator 210, a first code Read Only Memory (ROM) 212, a first common data and first address bus 217, a first controller 220, and a first static memory 222 storing one or more first applications 223 for group management. The device 200 is described hereafter in further detail.

As shown in FIG. 2, the device 200 includes the communications unit 202 coupled to the common data and address bus 217 of the processing unit 203. While not depicted, the device 200 may also include one or more input devices (e.g., keypad, pointing device, touch-sensitive surface, etc.) and a display screen (which, in some embodiments, may be a touch screen and thus also act as an input device), each coupled to be in communication with the processing unit 203. The device 200 may also include one or more of speaker and a microphone used for interactions with the device 200.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices, such as the communication devices 103.

For example, the communications unit 202 may include one or more wireless transceivers 208, such as a DMR transceiver, a P25 transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. a display screen, an input device, a speaker and/or a microphone, and the like).

The controller 220 includes one or more logic circuits, one or more processors, one or more microprocessors, one or more ASIC (application-specific integrated circuits) and one or more FPGA (field-programmable gate arrays), and/or another electronic device. In some embodiments, the controller 220 and/or the device 200 is not a generic controller and/or a generic device, but a device specifically configured to implement functionality for managing access authorizations of devices. For example, in some embodiments, the device 200 and/or the controller 220 specifically comprises a computer executable engine configured to implement specific functionality for managing access authorizations of devices.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the device 200 as described herein are maintained, persistently, at the memory 222 and used by the controller 220 which makes appropriate utilization of volatile storage during the execution of such programming instructions.

In particular, the memory 222 stores instructions corresponding to the one or more applications 223 (shown as first application(s) 223 in FIG. 2) that, when executed by the controller 220, enables the controller 220 to implement functionality for managing access authorizations of devices. In illustrated examples, when the controller 220 executes the one or more applications 223, the controller 220 is enabled to: receive a request to alter access authorization of one or more devices assigned to a user (e.g. the user 101); determine at least one contextual condition associated with at least one of the one or more devices; determine, based on the at least one contextual condition, a subset of the one or more devices for which the access authorization is to be altered to include at least one other user (e.g. the at least one other user 102); and, alter the access authorization of the subset of the one or more devices to include the at least one other user, such that the at least one other user is granted access to the subset of the one or more devices.

Hence, the one or more applications 223 may alternatively be referred to as group management applications as the one or more applications 223 may be used to manage devices for groups of users and/or groups of devices. Indeed, different applications, of the one or more applications 223, may be used depending on a mode of group management. For example, one of the one or more applications 223 may be used to alter the access authorization of the subset of the one or more devices to include the at least one other user by altering the access authorization to include both the user 101 and the at least one other user 102, while another of the one or more applications 223 may be used to alter the access authorization of the subset of the one or more devices by fully transferring the access authorization to from the user 101 to the at least one other user 102. Hereafter, the one or more applications 223 will be interchangeably referred to as the application 223.

However, while present embodiments are described with respect to the analytical computing device 162 managing access authorizations of devices, such functionality may be at least partially performed by one or more of the devices assigned to the user 101, the infrastructure controller 156, the dispatch computing device 158, the analytical computing device 162, the media access computing device 169 and/or a combination thereof. In other words, the functionality of the system 100 may be distributed among a plurality of devices of the system 100.

Indeed, such functionality may also be at least partially embodied in the form of an electronic digital assistant, which may be located at one or more of (and/or distributed between one or more of) the one or more of the devices assigned to the user 101, the infrastructure controller 156, the analytical computing device 162 and a combination thereof.

Figure 3:
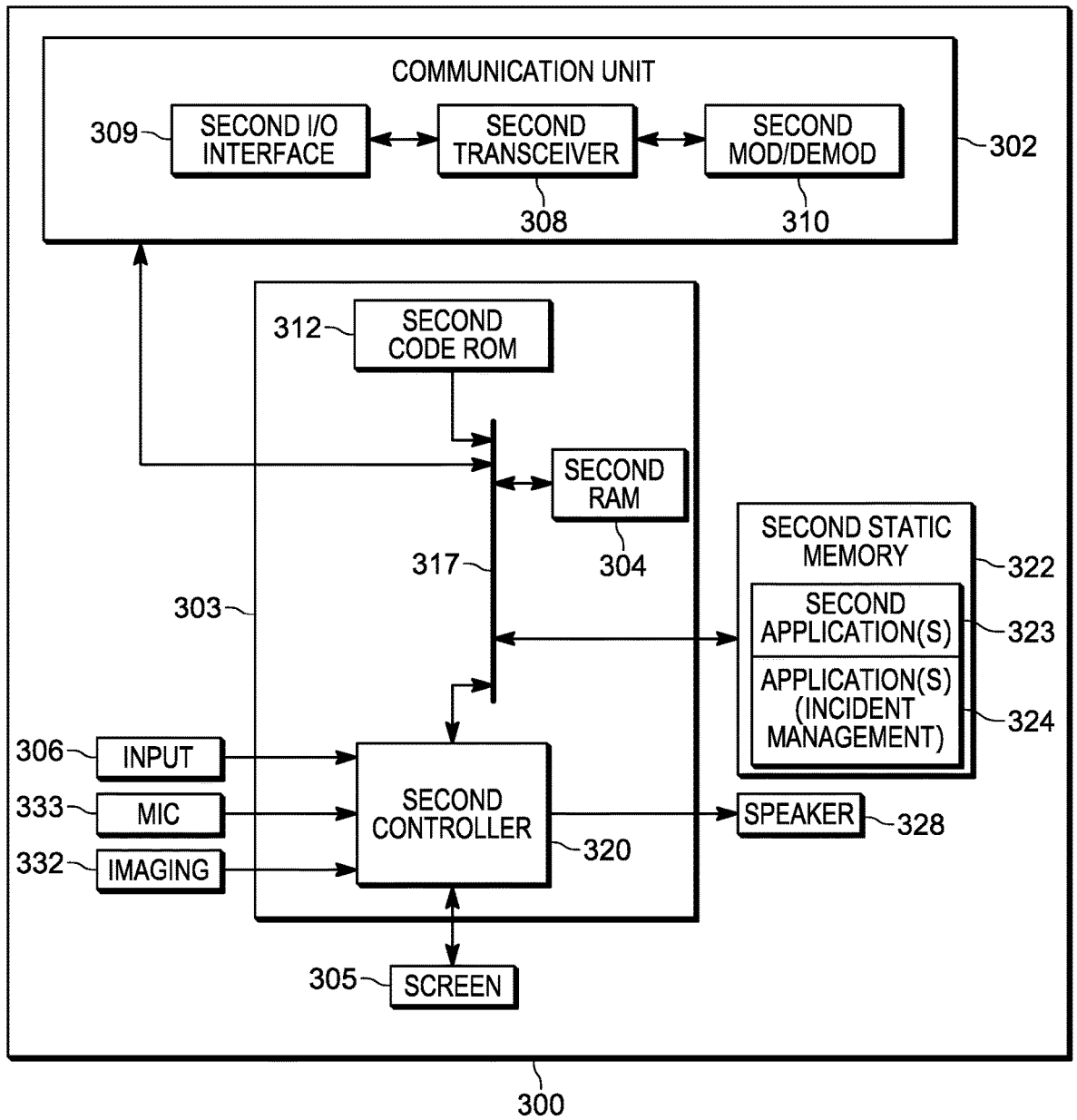
FIG. 3 is a device diagram showing a device structure of a device to which access authorization may be managed in accordance with some embodiments.

Attention is next directed to FIG. 3 which sets forth a schematic diagram that illustrates an example second device 300. One or more of the one or more of the devices assigned to the user 101, such as the portable radio 107 and/or the mobile communication device 133 of the vehicle 132, may have a configuration similar to the device 300.

As depicted in FIG. 3, the example device 300 generally includes a second communications unit 302, a second processing unit 303, a second Random-Access Memory (RAM) 304, a display screen 305, an input device 306, one or more second wireless transceivers 308, one or more second wired and/or wireless input/output (I/O) interfaces 309, a second combined modulator/demodulator 310, a second code Read Only Memory (ROM) 312, a second common data and address bus 317, a second controller 320, a second static memory 322 storing one or more second applications 323 and (for example) an incident management application 324, a speaker 328, an imaging device 332 and a microphone 333.

However, while the device 300 is described with respect to including certain components, it is understood that the device 300 may be configured according to the functionality of a specific device. For example, one or more of the imaging device 332, the microphone 333 and/or other media components associated with the device 300 may be external to the device 300 and communicatively coupled thereto.

As another example, in some embodiments, the device 300 may further include a location determination device (for example, a global positioning system (GPS) receiver) and the like. Other combinations are possible as well.

Furthermore, the device 300 may be communicatively coupled to other devices for example in the personal area network 121 and/or the vehicle area network 138 of FIG. 1.

The example device 300 is described hereafter in further detail. As shown in FIG. 3, the device 300 includes the communications unit 302 coupled to the common data and address bus 317 of the processing unit 303. The device 300 may also include one or more input devices 306 (e.g., keypad, pointing device, touch-sensitive surface, etc.) and the display screen 305 (which, in some embodiments, may be a touch screen and thus also act as an input device 306), each coupled to be in communication with the processing unit 303.

The speaker 328 may be present for reproducing audio that is decoded from voice or audio streams of calls received via the communications unit 302 from other portable radios, from digital audio stored at the device 300, from other ad-hoc or direct mode devices, and/or from an infrastructure RAN device, or may playback alert tones or other types of pre-recorded audio.

The imaging device 332 may provide video (still or moving images) of an area in a field of view of the device 300 for further processing by the processing unit 303 and/or for further transmission by the communications unit 302.

The microphone 333 may be present for capturing audio from a user and/or other environmental or background audio that is further processed by the processing unit 303 and/or is transmitted as voice or audio stream data, or as acoustical environment indications, by the communications unit 302 to other portable radios and/or other communication devices.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communications unit 302 may include one or more wired and/or wireless input/output (I/O) interfaces 309 that are configurable to communicate with other communication devices, such as the communication devices 103 and/or the dispatch computing device 158 and/or the analytical computing device 162.

For example, the communications unit 302 may include one or more wireless transceivers 308, such as a digital mobile radio (DMR) transceiver, a Project 25 (P25) transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some embodiments, the controller 320 and/or the device 300 is not a generic controller and/or a generic device, but a device specifically configured to implement functionality for granting access to at least a subset of the device 300 and/or devices associated with the device 300. For example, in some embodiments, the device 300 and/or the controller 320 specifically comprises a computer executable engine configured to implement specific functionality for granting access to at least a subset of the device 300 and/or devices associated with the device 300.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the device 300 as described herein are maintained, persistently, at the memory 322 and used by the controller 320 which makes appropriate utilization of volatile storage during the execution of such programming instructions.

In particular, the memory 322 stores instructions corresponding to the one or more applications 323 that, when executed by the controller 320, enables the controller 320 to implement functionality for granting access to at least a subset of the device 300 and/or devices associated with the device 300 (and/or devices associated with a user (e.g. the user 101) of the device 300). In illustrated examples, when the controller 320 executes the one or more applications 323, the controller 320 is enabled to: receive authorization to grant at least one further user access to at least a subset of the device 300 and/or a subset of devices associated with the device 300, for example devices in a personal area network; and in response, grant at least one further user access to at least a subset of the device 300 and/or a subset of devices associated with the device 300 (and/or the user of the device 300). For example, the at least one other user may enter login credentials, and the like, at the device 300 (e.g. using the input device 306) and the device 300 will grant access to the at least one other user; as such the authorization may include the login credentials, and the like which the device 300 may use to compare to the login credentials received at the input device 306. Alternatively, the at least one other user may be remote from the device 300 and access the device 300 via a network using login credentials. Alternatively, a communication device of the at least one other user may be used to access the device 300, for example via a local communication link, and the like.

The one or more applications 323 may hence be alternatively referred to as a dynamic equipment management application. Indeed, different applications, of the one or more applications 323, may be used depending on a mode of dynamic equipment management. Hereafter, the one or more applications 323 will be interchangeably referred to as the application 323.

Alternatively, the device 300 may be configured for similar functionality as the device 200; hence, in these embodiments, the application 323, when executed by the controller 320, may enable the controller 320 to implement functionality for granting access to at least a subset of the device 300 and/or devices associated with the device 300. In illustrated examples, when the controller 320 executes the application 323, the controller 320 may be further enabled to: receive a request to alter access authorization of one or more devices assigned to a user (e.g. the user 101); determine at least one contextual condition associated with at least one of the one or more devices; determine, based on the at least one contextual condition, a subset of the one or more devices for which the access authorization is to be altered to include at least one other user (e.g. the at least one other user 102); and, alter the access authorization of the subset of the one or more devices to include the at least one other user, such that the at least one other user is granted access to the subset of the one or more devices.

Hence, the application 323 may alternatively be referred to as a group management application as the application 323 may alternatively include functionality similar to the functionality of the application 223.

Furthermore, the incident management application 324 may comprise an application that, when executed by the controller 320, enables the controller 320 to implement functionality for incident management (e.g. writing and/or uploading incident reports, receiving and/or making incident assignments, and the like). However, the application 324 is appreciated to be optional and/or the application 324 may be configured for any specialized functionality of the device 300; for example, when the device 300 is used for warehouse functionality, the application 324 may comprise a warehouse management application.

Figure 4:
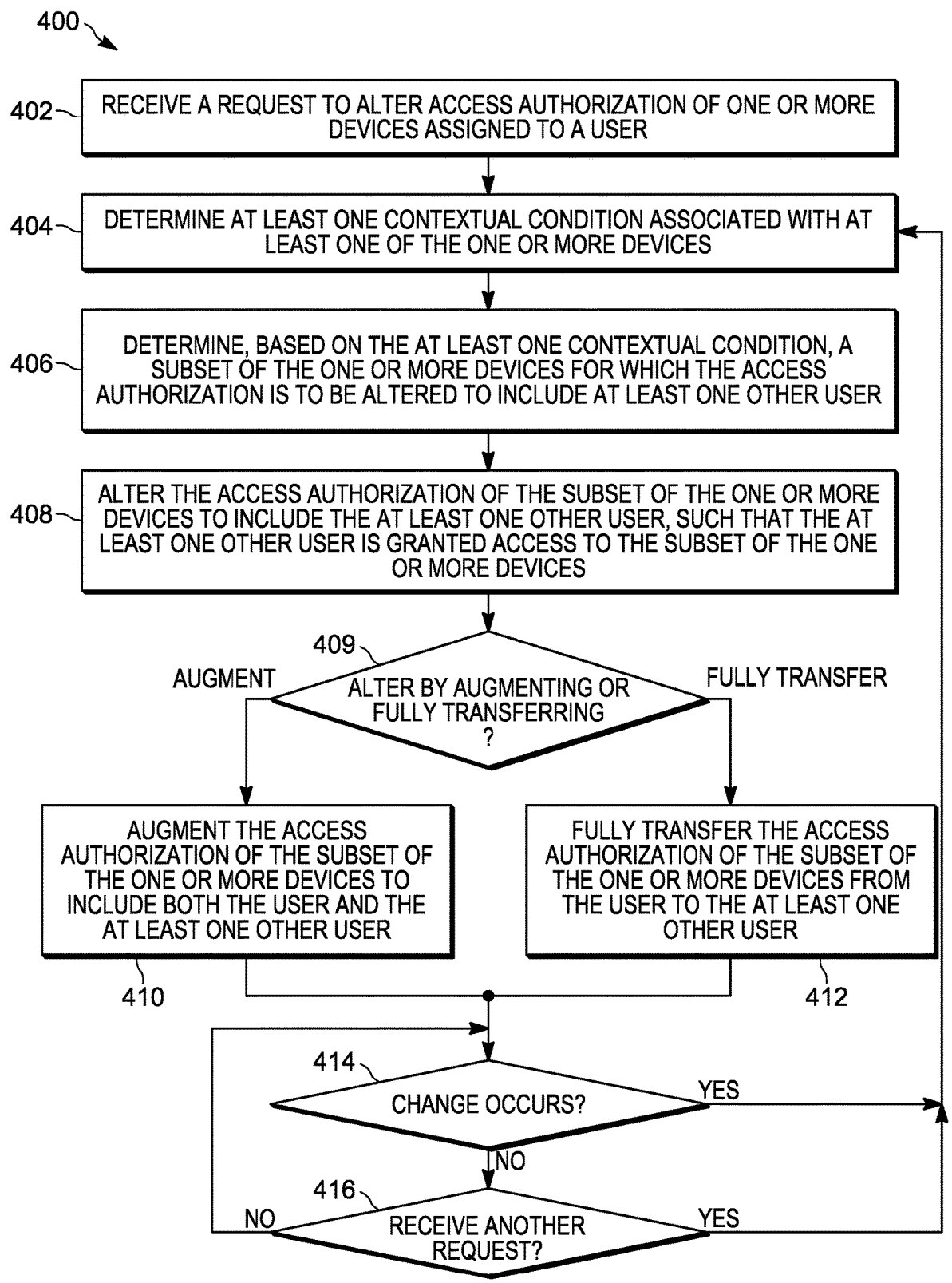
FIG. 4 is a flowchart of a method for managing access authorizations of devices in accordance with some embodiments.

Attention is now directed to FIG. 4 which depicts a flowchart representative of a method 400 for managing access authorizations of devices. The operations of the method 400 of FIG. 4 correspond to machine readable instructions that are executed by, for example, the device 200, and specifically by the controller 220 of the device 200. In the illustrated example, the instructions represented by the blocks of FIG. 4 are stored at the memory 222 for example, as the application 223. The method 400 of FIG. 4 is one way in which the controller 220 and/or the device 200 and/or the system 100 is configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present embodiments.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

Furthermore, while it is understood by one skilled in the art that the method 400 is performed at the device 200, the method 400 may be performed at one or more of the devices of the system 100, for example at the device 300 and/or a combination of one or more of at least one of the devices of the PAN 121 and/or the VAN 138, the infrastructure controller 156, the dispatch computing device 158, the analytical computing device 162, the media access computing device 169, etc. Hence, while the controller 220 is described as implementing the blocks of the method 400, alternatively the controller 320 of the device 300 may implement the blocks of the method 400. Alternatively, the blocks of the method 400 may be partially implemented by the controller 220 of the device 200 and partially implemented by the controller 320 of the device 300. Alternatively, the method 400 may be at least partially implemented by a combination of the devices of the PAN 121 and/or the VAN 138, for example a combination of one or more of the portable radio 107, the laptop 116 and the mobile communication device 133.

At a block 402, the controller 220 receives a request to alter access authorization of one or more devices assigned to a user (e.g. the user 101). The request may be received from the dispatch computing device 158, the input device 306 of the device 300 (e.g. a device of the PAN 121 and/or the VAN 138), and/or the communication device 103. For example, the user 101 may be down due to an injury, and the like, and the at least one further user 102 may be operating one or more of the following to cause the request to be generated: an input device of the dispatch computing device 158; the input device 306 of the device 300; and an input device of the device 103.

For example, the request to alter the access authorization of the subset of devices may be generated by one or more of: a device of the one or more devices assigned to the user 101; a communication device 103 associated with the at least one other user 102; and a computing device different from the one or more devices assigned to the user 101 and the communication device 103 (including, but not limited to, the dispatch computing device 158).

At a block 404, the controller 220 determines at least one contextual condition associated with at least one of the one or more devices.

The at least one contextual condition may include, but is not limited to, one or more of the following:

A health-related contextual condition of the user 101 detected by one or more devices of the user 101. For example, the biometric sensor wristband 119 may detect that the user 101 has a weak heart rate, and/or a falling body temperature, and the like, which may indicate a contextual condition that the user 101 is injured and/or down. Similarly, a vest sensor may indicate that a vest is pierced and/or impacted with a given force, which may indicate a contextual condition of the user 101 being injured. Similarly, an accelerometer and/or gyroscope and/or man-down sensor may detect a contextual condition of the user 101 being prone and/or not standing and/or laying down (e.g. the user 101 may be injured). Alternatively, health-related contextual condition of the user 101 may be determined using video data generated by the at least one camera 173, assuming the video data includes the user 101 and assuming that the location of the at least one camera 173 is known (e.g. store in the one or more databases 163).

A location associated with one or more of the user 101 and the one or more devices of the user 101. For example, the device 200 may have access to a location of the user 101 and/or the device 300 and/or an associated device (e.g. in the PAN 121 and/or the VAN 138, for example as reported by a GPS device at the device 300. Alternatively, the location of the user 101 may be determined using video data generated by the at least one camera 173, assuming the video data includes the user 101 and assuming that the location of the at least one camera 173 is known (e.g. store in the one or more databases 163).

An incident contextual condition associated with one or more of the user 101 and the one or more devices of the user 101. For example, the sensor-enabled holster 118 may detect a change in state (presence to absence) and/or an action (removal) relative to the weapon normally disposed within the sensor-enabled holster 118 may indicate a contextual condition of an incident where the user 101 is in danger. Similarly, the user 101 and the one or more devices assigned to the user 101 may be assigned to an incident of a given type, such as a bank robbery in progress and/or another violent incident, and the like, for example as stored in one or more of the databases 163. The incident contextual condition may be determined from an incident assignment stored in one or more of the databases 163, assuming that the user 101 has been assigned to an incident of a given type using an incident assignment.

A change in the incident contextual condition; for example, an incident may escalate from a minor incident to a violent incident, as reported to the dispatch computing device 158 by the user 101 and/or the at least one further user 102, and/or as detected in video data from the at least one camera 173.

A presence associated with one or more of the user 101 and the one or more devices of the user 101. For example, the device 300 may include a presence application, and the like, and a presence of the user 101 may be determined at the device 300 via the presence application. Such presence contextual conditions may include, but are not limited to, the user 101 being at an incident location, on the way to the incident location, and the like.

A role associated with one or more of the user 101 and the one or more devices of the user 101. For example, one or more of the databases 163 may store a role of the user 101 in an organizational hierarchy, and the like, such as a rank, and the like (e.g. "Officer", "Sergeant", "Captain" and the like).

A jurisdiction associated with one or more of the user 101 and the one or more devices of the user 101. For example, one or more of the databases 163 may store a jurisdiction of the user 101 such as a city name, county name, a precinct name, and the like.

At a block 406, the controller 220 determines, based on the at least one contextual condition, a subset of the one or more devices for which the access authorization is to be altered to include at least one other user (e.g. the at least one other user 102).

For example, when the least one other user 102 is of a rank that is higher than the user 101, then the at least one other user 102 may be granted access to all the devices of the user 101, whereas when the least one other user 102 is of a rank that is lower than the user 101, then the at least one other user 102 may be granted access to only some of the devices of the user 101. Indeed, the application 223 may include rules and/or criteria that define which devices for the access authorization is to be altered based on various contextual conditions.

Furthermore, the subset the one or more devices for which the access authorization is to be altered may include a portion of one device of the one or more devices of the user 101. For example, the second user 102 may be granted access authorization to only a memory of the device 300 (e.g. the static memory 322 where data collected by the device 300 may be stored) and/or only the imaging device 332. Similarly, the second user 102 may be granted access authorization to only an application at the device 300, such as the incident management application 324.

Hence, the subset of the one or more devices of the user 101 to which access authorization may be altered may comprise one or more of: a portion of one device of the one or more devices; an application at the one device of the one or more devices; one or more accessory devices (e.g. in the PAN 121) associated with a hub device (such as the portable radio 107) of the one or more devices; one or more personal access network devices associated with a hub device of the one or more devices; and the like.

At a block 408, the controller 220 alters the access authorization of the subset of the one or more devices to include the at least one other user, such that the at least one other user is granted access to the subset of the one or more devices.

Such alteration may occur by one of at least two modes which may depend on the at least one contextual condition determined at the block 404. Hence at a block 409, the controller 220 determines whether to alter the access authorization by augmenting access authorization of the subset of the one or more devices to include both the user and the at least one other user or to alter by fully transferring the access authorization of the subset of the one or more devices from the user to the at least one other user. The mode selected may depend on one or more contextual conditions of the user 101 and/or the at least one user 102 who is to gain access to the one or more devices; such contextual conditions are described in further detail below.

For example, in one mode such alteration occurs via a block 410 in which the controller 220 (e.g. when an "Augment" decision occurs at the block 409) augments the access authorization of the subset of the one or more devices to include both the user and the at least one other user.

In another mode, such alteration may occur via a block 412 in which the controller 220 220 (e.g. when a "Fully Transfer" decision occurs at the block 409) fully transfers the access authorization of the subset of the one or more devices from the user to the at least one other user.

It is understood that each of the block 410 and the block 412 represent specific embodiments of the block 408 and may be performed in conjunction therewith (as well as the block 409).

At a block 414, the controller 220 monitors the system 100 for any changes that may occur including, but not limited to, contextual changes such a change in a status associated with the user 101 and/or the at least one user 102 (e.g. a change in a detector status, such as change in the sensor-enable holster 118 and/or a man-down sensor), a change in incident assignment (e.g. more users 102 are assigned to an incident to which the user 101 and/or the users 102 are currently assigned and/or one or more of the users 102 previously assigned to the incident are unassigned to the incident), and the like. When such a change occurs (e.g. a "YES" decision at the block 414), the controller 220 may repeat the method 400 from the block 404.

Otherwise (e.g. a "NO" decision at the block 414), at a block 416, the controller 220 may receive another request (e.g. a "YES" decision at the block 416), similar to the request received at the block 402, and the controller 220 may repeat the method 400 from the block 404. When no request is received (e.g. a "NO" decision at the block 416), the controller 220 may continue to monitor for changes and/or requests. Furthermore, the blocks 414, 416 may be executed in parallel and/or in any order.

Furthermore, in some embodiments, the access authorization, for one or more of the devices (and/or applications) of the user 101, may already have been granted to one or more of the users 102, for example by the dispatch computing device 158, and the like. In these embodiments, the method 400 may include the controller 220 requesting, from the dispatch computing device 158 and/or a resource management computing device, access authorizations of the users 102.

Similarly, in some embodiments, the method 400 may include the controller 220 requesting approval from the dispatch computing device 158, and the like, for any alterations to the access authorization of the subset of the one or more devices of the user 101. For example, the dispatch computing device 158 may be implementing a resource management application for the devices of the users 101, 102; indeed, such a resource management application may have been used to grant the access authorizations stored in the one or more databases 163.

Example embodiments of the method 400 is next described with respect to FIG. 5 to FIG. 10.

Figure 5:
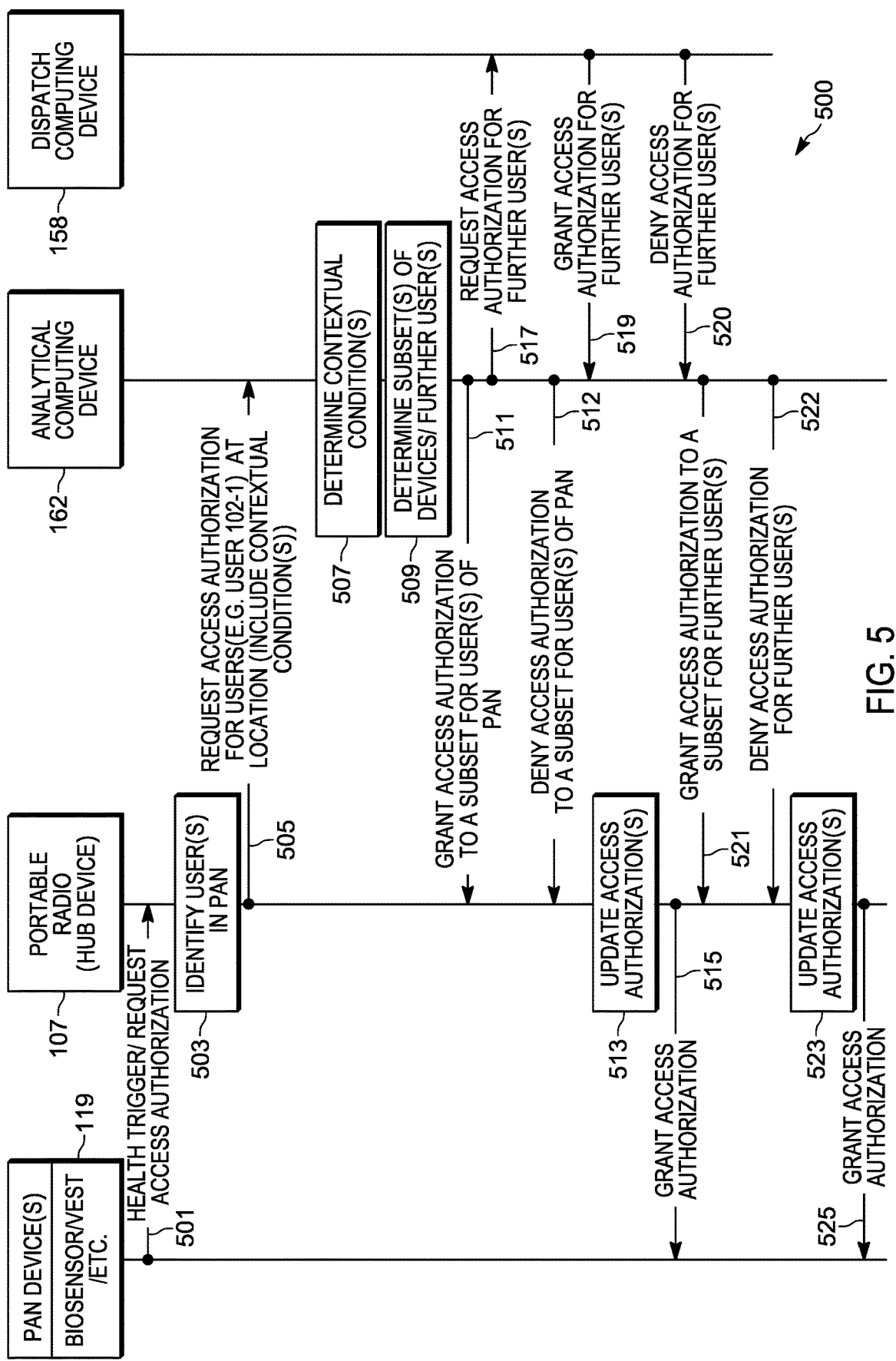
FIG. 5 is a signal diagram showing communication between the components of the system of FIG. 1 when implementing the method for managing access authorizations of devices in accordance with some embodiments.

Attention is next directed to FIG. 5 which depicts a signal diagram 500 showing communication between devices of the PAN 121 (and in particular a device for monitoring the health of the user 101, such as the biometric sensor wristband 119, and/or a vest sensor and the like), a PAN hub device, such as the portable radio 107, the analytical computing device 162 and the dispatch computing device 158. It is understood by one skilled in the art that the controller 220 of the analytical computing device 162 is executing the application 223 (and/or a group management application), the controller 320 of the portable radio 107 is executing the application 323 (and/or a dynamic equipment application), and the dispatch computing device 158 is implementing a resource management application. In particular, in these embodiments, the analytical computing device 162 is implementing the method 400.

As depicted a PAN device, such as the biometric sensor wristband 119, detects a health-related contextual condition (e.g. a man-down condition, a vest-pierced condition, and the like) of the user 101, and in response transmits a request 501 to the hub device (e.g. the portable radio 107). The request 501 may hence be referred to as being triggered based on a health-related contextual condition. The request 501 may include data that indicates the health-related contextual condition and/or may be comprise an explicit request to alter the access authorizations of the devices of the PAN 121, for example such that at least one further user 102 may assist the user 101 who has been detected as having a health-related contextual condition. In response, the portable radio 107 may identify 503 other users associated with the PAN 121, such as the user 102-1, for example via the association between the identifiers 181, 182-1 from the one or more databases 163 and/or as stored at a memory of the portable radio 107. The portable radio 107 may determine other types of contextual conditions associated with the user 101 and/or the devices of the user 101, including, but not limited to, the location, a role of the user 101, a jurisdiction of the user 101, etc., for example as stored at a memory of the portable radio 107 and/or by accessing the one or more databases 163.

The portable radio 107 transmits, to the analytical computing device 162, a request 505 for access authorization for users associated with the PAN 121 to devices of the PAN 121. The request 505 may furthermore include the health-related contextual condition determined by the biometric sensor wristband 119 and/or a vest sensor and the like, as well as any other contextual conditions determined by the portable radio 107. The analytical computing device 162 receives the request 505 (e.g. at the block 402 of the method 400). The analytical computing device 162 may determine 507 (e.g. at the block 404 of the method 400), contextual conditions of the user 101 and/or the devices of the user 101 by receiving such contextual conditions in the request 505 and/or by determining one or more contextual conditions from the one or more databases 163 and/or by processing video data and/or audio data, and the like, from the at least one camera 173 and/or microphone 175 (and/or from video data and/or audio data, and the like from multimedia devices of the PAN 121 and/or the VAN 138).

The analytical computing device 162 determines 509 (e.g. at the block 406 of the method 400) a subset of the devices of the user 101 for which the access authorization, for example for the user 102-1. The analytical computing device 162 may further determine (e.g. at the block 408 of the method 400) to alter the access authorization (e.g. at the block 409) by augmenting (e.g. at the block 410 of the method 400) the access authorization of the devices of the user 101 to include the user 102-1 or by fully transferring (e.g. at the block 412 of the method 400) the access authorization of the devices from the user 101 to the user 102-1, for example based on a role of the user 101 and/or the user 102-1 and/or other contextual conditions.

For example, when contextual conditions of the user 101 indicate that the user 101 is fully incapacitated (e.g. unconscious and the like) and that the user 101 has a lower rank than the user 102-1, the access authorization of all the devices of the user 101 may be fully transferred to the user 102-1.

However, when contextual conditions of the user 101 indicate that the user 101 is not incapacitated (e.g. conscious and the like) and that the user 101 has a lower rank than the user 102-1, the access authorization of only some of the devices of the user 101 may be augmented to include the user 102-1.

Similarly, when contextual conditions of the user 101 indicate that the user 101 is incapacitated (e.g. unconscious and the like) and that the user 101 has a higher rank than the user 102-1, the access authorization of only the application 324 of the portable radio 107 (and/or the device 300) may be augmented to include the user 102-1, or fully transferred to the user 101.

Indeed, various rules and/or criteria for determining a subset of the devices of the user 101 for which the access authorization is to be altered to include at least one other user 102, may be included in the application 223 (and/or the application 323). Such rules and/or criteria for determining a subset of the devices of the user 101 for which the access authorization is to be altered to include at least one other user 102 may alternatively be referred to as approval conditions. When an approval condition is not met, access authorization may be denied. For example, when a user 102 has a lower rank then the user 101, is not associated with the same jurisdiction and has not been assigned to the same incident to which the user 101 is currently assigned, an approval condition may not be met and access authorization may be denied.

Furthermore, in some embodiments, some of the devices of the user 101 may be excluded from the subset of the devices to which access authorization is to be altered to include at least one further user 102. For example, the laptop 116 may always be excluded from the subset. Alternatively, exclusion of one or more devices of the user 101 may be based on the at least one contextual condition associated with the at least one of the one or more devices of the user 101, and a respective contextual condition associated with the at least one other user 102. For example, when the user 101 outranks the user 102, the laptop 116 may be excluded from the subset. Alternatively, the user 101 may determine what devices and/or portions of a device can or cannot be authorized and preconfigure (e.g. at the application 223), at the device 300 and/or at the device 200, what subset of devices or subset of a particular device can or cannot be authorized to be given access; such pre configuration may further include identifiers of particular other users 102 that may never be assigned access (e.g. in a black list) or always be assigned access (e.g. a white list) or always be assigned partial access, and the like.

For example, the analytical computing device 162 may be further configured to: determine, based on the at least one contextual condition associated with the at least one of the one or more devices of the user 101, and a respective contextual condition associated with the at least one other user 102, a second subset of the one or more devices for which the access authorization is not be altered; and exclude the second subset of the one or more devices from the subset of the one or more devices to which the at least one other user 102 is granted access. Hence, for example, a lower ranking police officer may not be granted access to sensitive and/or confidential information of a higher ranking officer, stored on the laptop 116.

Once the subset of the one or more devices for which the access authorization is to be altered to include at least one other user 102-1 is determined, the analytical computing device 162 alters (e.g. at the block the 408) the access authorization of the subset of the one or more devices to include the at least one other user 102-1, for example by transmitting, to the portable radio 107, a granted access authorization 511 to the subset of the devices of the user 101. While not depicted, the analytical computing device 162 may request authorization to alter the access authorizations of the subset of the devices of the user 101 from the dispatch computing device 158.

The granted access authorization 511 may include credentials of the user 102-1 retrieved from the one or more databases 163 such that the user 102-1 may login to the subset of the devices of the user 101 to which access has been granted. The granted access authorization 511 may also include an indication of whether the access authorization has been augmented to include the user 102-1, as per the block 410 of the method 400, or fully transferred to the user 102-1, as per the block 412 of the method 400. When the access authorization has been augmented to include the user 102-1, the user 101 may remain logged into the subset of the devices. However, when the access authorization has been fully transferred to the user 102-1, the user 101 may be logged out of the subset of the devices and prevented, for example by the portable radio 107, from logging back into the subset of the devices.

Alternatively, one or more users 102 associated with the PAN 121 (e.g. assuming more than two other users 102 associated with the PAN 121) may be denied access, and such a denial 512 of access may be transmitted to the portable radio 107 with the granted access authorization 511. For example, the method 400 may further comprise, when one or more of the at least one contextual condition associated with the at least one of the one or more devices of the user 101, and a respective contextual condition associated with the at least one other user 102, does not meet an approval condition: denying the access authorization.

The portable radio 107 receives the granted access authorization 511 and updates 513 the access authorizations at the devices of the user 101 accordingly. The portable radio 107 may then transmit granted access authorizations 515 to the subset of the devices to which access authorization has been granted. The user 102-1 may then login to the subset, for example on an individual basis and/or login to the portable radio 107 to access and/or use the subset of the devices.

As depicted, in some alternative implementations, the analytical computing device 162 may also determine 509 (e.g. when determining the subset) whether any further users 102 are to be granted access authorization, for example the users not associated with the PAN 121 and/or at a dispatch center. In some of these embodiments, as depicted, the analytical computing device 162 transmits a request 517 for access authorization for further users which may include the identifier 181 of the user 101, as well as any contextual conditions. The request 517 may also include data indicating the user 102-1 to which access authorization has already been granted, as well as the associated subset of the devices.

The dispatch computing device 158 may determine that the user 102-2 is also at the location of the user 101 and/or determine a dispatcher managing the incident at the location of the user 101, and return, to the analytical computing device 162, identifiers of the user 102-2 and/or the dispatcher, and the like, in a granted access authorization 519, as well as credentials, etc., of the user 102-2 and/or the dispatcher. The granted access authorization 519 is otherwise similar to the granted access authorization 511, and may also include whether the access authorization is to be augmented or fully transferred. In other words, the dispatch computing device 158 may also perform a portion of the method 400. Alternatively, access may be denied in a denial 520.

For example, determining (e.g. at the block 406 of the method 400), based on the at least one contextual condition, the subset of the one or more devices for which the access authorization is to be altered to include the at least one other user 102 may at least partially comprise: transmitting, to a resource management computing device (e.g. the dispatch computing device 158), a request for the access authorization; and receiving, from the resource management computing device, approval for granting the access authorization for at least a portion of the subset of the one or more devices of the user 101.

The analytical computing device 162 may then transmit a granted access authorization 521, and/or a denial 522, to the portable radio 107, and/or a denial 522, the granted access authorization 521 being similar to the granted access authorization 519, though the analytical computing device 162 may alter the granted access authorization 519 based on rules and/or criteria of the application 223. The portable radio updates 523 the access authorizations based on the granted access authorization 521 and transmits 525 access authorizations to the subset of the devices to which access authorization has been granted for the user 102-2 and/or the dispatcher and the like.

Furthermore, the subsets of devices of the user 101 for which access authorization is granted may be the same or different for each of the users 102-1, 102-2. For example, the access authorization of two or more subsets of the one or more devices of the users 101 may be altered, such that two or more other users (e.g. other than the user 101) are granted access to a respective subset of the two or more subsets of the one or more devices of the user 101.

The portable radio 107 may continue to monitor (e.g. at the block 414 and 416) whether any further requests and/or health changes occur (e.g. when another request 501 is received) and repeat the process described with respect to FIG. 5 when so.

Figure 6:
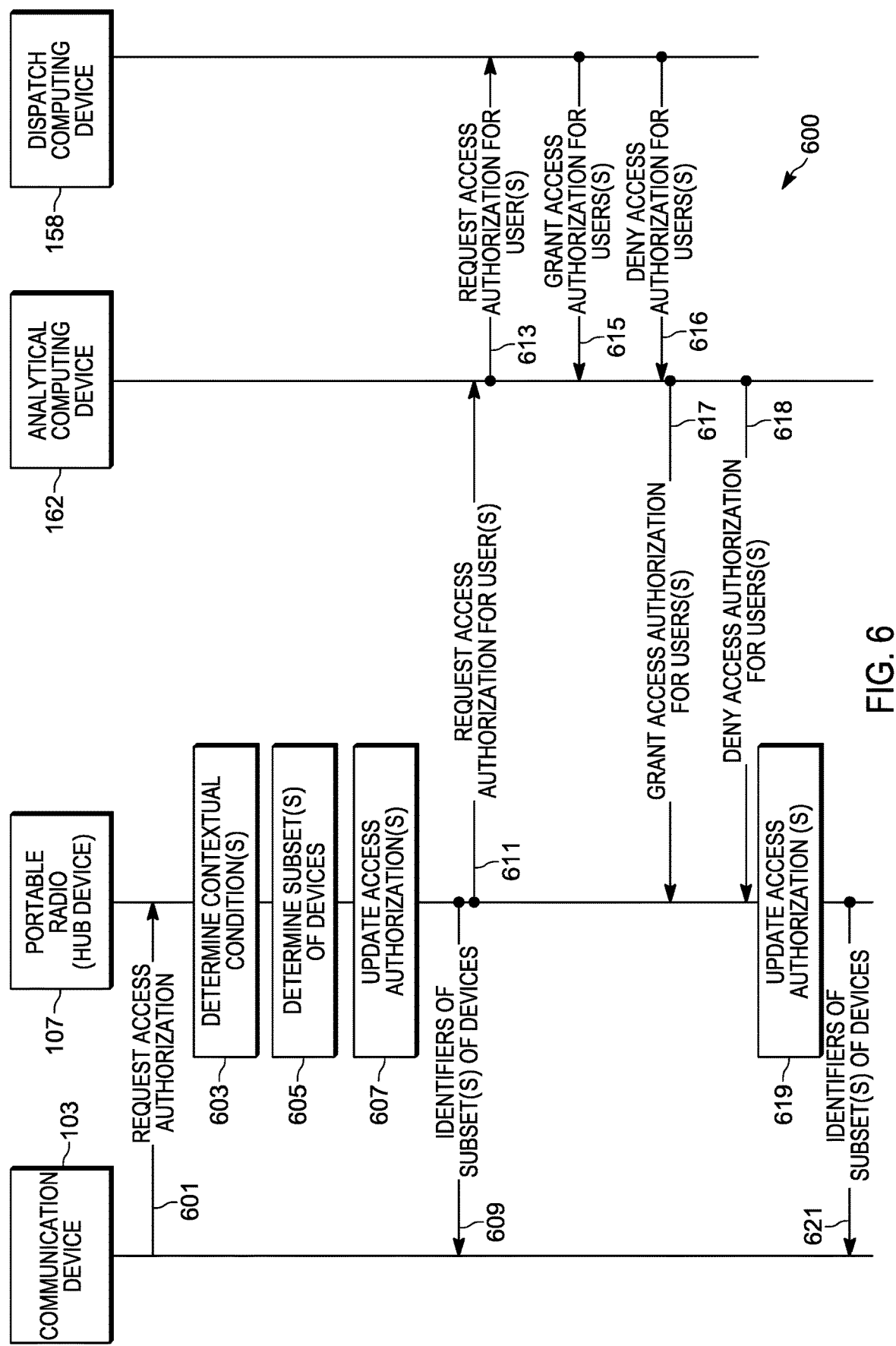
FIG. 6 is a signal diagram showing communication between the components of the system of FIG. 1 when implementing the method for managing access authorizations of devices in accordance with some alternative embodiments.

Attention is next directed to FIG. 6 which depicts a signal diagram 600 showing communication between a communication device 103 of one or more of the users 102, a PAN hub device, such as the portable radio 107, the analytical computing device 162 and the dispatch computing device 158. It is understood by one skilled in the art d in FIG. 6 that the portable radio 107 is implementing the method 400 (e.g. the controller 320 of the portable radio 107 is implementing a group management application), that the analytical computing device 162 is acting as a conduit between the dispatch computing device 158 and the portable device 107, and the dispatch computing device 158 is implementing a resource management application. Indeed, in some of these implementations, the analytical computing device 162 may be omitted.

As depicted the communication device 103 transmits a request 601 for access authorization to the portable radio 107, which requests access authorization to the devices of the user 101, for one or more of the users 102 and/or other users, such as a dispatcher. The request 601 may be for access authorization for the respective user 102 of the communication device 103 and/or for another user 102. The request 601 may hence include identifiers 182 of the users 102 for which access authorization is being requested. The request 601 may further include credentials of the users 102 for which access authorization is being requested.

The request 601 may further include contextual conditions of the device 103 and/or contextual conditions of the devices of the user 101; for example, the communication device 103 may provide a user interface (including checkboxes and the like) which enables a user 102 to indicate contextual conditions for why the request 601 is being transmitted (e.g. the user 101 is incapacitated). The request 601 may also include other contextual conditions of the communication device 103 and/or users 102 for which access authorization is being requested, for example a location, a role, a jurisdiction, an incident assignment, and the like.

In response to receiving the request 601 (e.g. at the block 402 of the method 400), the portable radio 107 may determine 603 (e.g. at the block 404 of the method 400), contextual conditions of the user 101 and/or the devices of the user 101 using devices of the PAN 121 (e.g. such as the biosensor wristband 119, a vest sensor and the like) and/or by determining one or more contextual conditions from the one or more databases 163 and/or by processing video data, and the like, from the at least one camera 173 (and/or from video data, and the like from multimedia devices of the PAN 121 and/or the VAN 138).

The portable radio 107 also determines 605 (e.g. at the block 406 of the method 400) one or more subsets of the devices of the user 101 for which the access authorization is being requested. The portable radio 107 may further determine (e.g. at the block 408 of the method 400) whether to alter the access authorization by augmenting (e.g. at the block 410 of the method 400) the access authorization of the devices of the user 101 to include the users 102 identified in the request 601 or by fully transferring (e.g. at the block 412 of the method 400) the access authorization of the devices from the user 101 to the users 102 identified in the request 601, for example based on a role of the user 101 and/or the users 102 and/or other contextual conditions as described above.

The portable radio 107 may further determine whether any of the users for which access authorization is being requested need authorization, for example from the dispatch computing device 158. For example, the user 102-1 may not require authorization as the identifiers 181, 182-2 are associated, but the user 102-2 may require authorization as the identifiers 181, 182-3 are not associated.

For users 102 that do not require further authorization, the portable radio 107 grants such authorization (e.g. at the block 408 as well as the block 410 or the block 412) and updates 607 the access authorizations as described above with respect to the updates 514. The portable radio 107 transmits (not depicted in FIG. 6) access authorization to the subset(s) of the devices of the user 101 to which access has been granted, similar to transmission of the granted access authorization 515.

The portable radio 107 may then transmit 609, to the communication device 103, identifiers 191, 192 of the subset(s) of the devices of the user 101 to which access has been granted. When access for more than one user 102 was requested, the subsets may be the same or different, as described above.

When one or more of the users for which access authorization is requested requires further authorization, the portable radio transmits a request 611 for such authorization to the analytical computing device 162, which may include identifiers 182 of such users. The request 611 may also include data indicating the users 102 to which access authorization has already been granted, as well as the associated subset of the devices; the analytical computing device 162 may update the one or more databases 163 accordingly.

The analytical computing device 162 transmits a request 613 (similar to the request 517) to the dispatch computing device 158, which returns a granted access authorization 615 (assuming access is granted and/or a denial 616 assuming access is denied) to the analytical computing device 162; the analytical computing device 162 may update the one or more databases 163 accordingly.

The analytical computing device 162 transmits a granted access authorization 617 (similar to the granted access authorization 615, and/or a denial 618) to the portable radio 107, which updates 619 the access authorizations accordingly, as described above, and transmits 621 identifiers 191, 192 of the subsets of the devices of the users 101 to the communication device 103. The identifiers 191, 192 may be transmitted with an identifier of the users 102 associated with each of the subsets and/or identifiers 182 of the devices 103 associated with each of the subsets.

The portable radio 107 may continue to monitor (e.g. at the block 414 and 416) whether any further requests occur (e.g. when another request 601 is received) and repeat the process described with respect to FIG. 6 when so.

Furthermore, in each of the signal diagrams 500, 600 the portable device 107 and/or the analytical computing device 162 and/or the dispatch computing device 158 may update the altered access authorizations at the database 163.

For example, attention is next directed to FIG. 7, FIG. 8, FIG. 9 and FIG. 10 which depicts different embodiments of altered access authorizations at the one or more databases 163 and/or which may also be stored at a memory of a hub device of the PAN 121 and/or the VAN 138, and the like.

Figure 7:
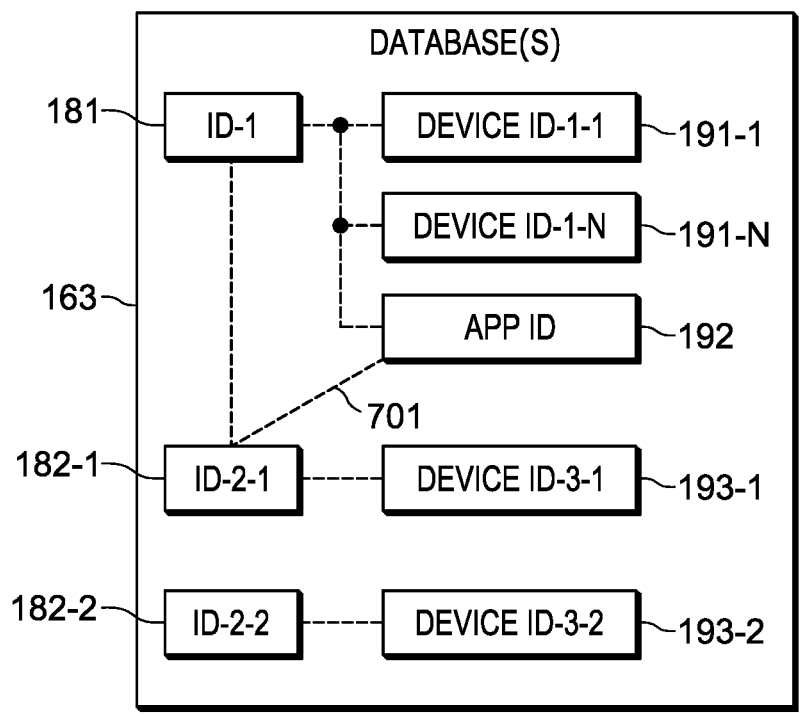
FIG. 7 depicts an access authorization of a subset of devices of a user, the access authorization of the subset augmented to include at least one other user in accordance with some embodiments.

For example, in FIG. 7, the access authorization of a subset of the devices of the user 101 has been altered by augmenting the access authorization of the application 324, identified by the application identifier 192, to include the user 102-1 identified by the identifier 182-1, as indicated by the dotted line 701 therebetween. Hence, the user 102-1 has been granted access only to the application 324. Alternatively, the user 102-1 may be granted access only to a subset of applications and/or components of one of the devices of the user 101. The user 102-2, identified by the identifier 182-2, has not been granted access authorization.

Figure 8:
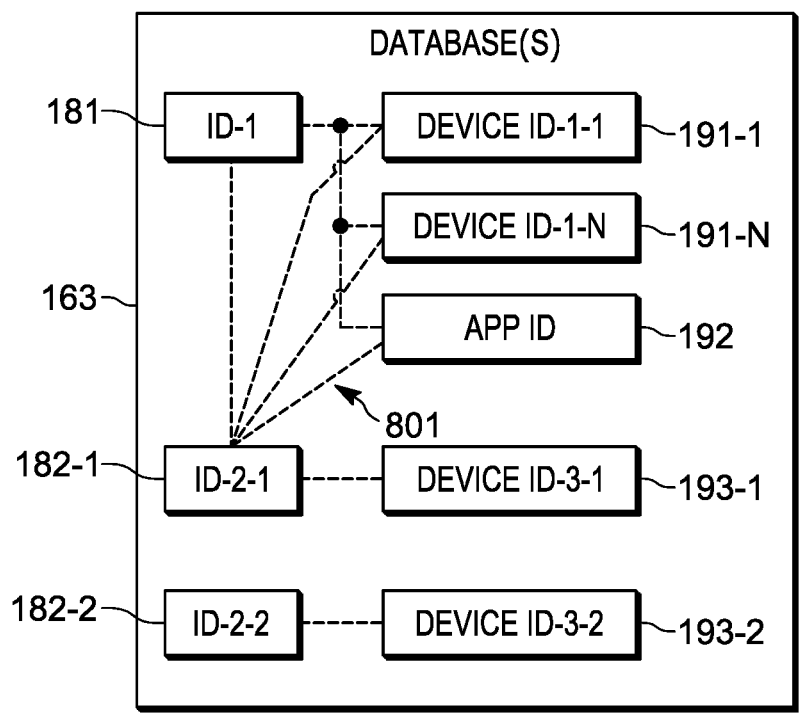
FIG. 8 depicts an access authorization of a subset of devices of a user, the access authorization of the subset augmented to include at least one other user in accordance with some alternative embodiments.

In an alternative example, in FIG. 8, the access authorization of a subset of the devices of the user 101 has been altered by augmenting the access authorization of all of the devices of the user 101 to include the user 102-1 as indicated by the dotted lines 801 between the identifier 182-1 and the identifiers 191, 192. Hence, the user 102-1 has been granted access to all the devices of the user 101. The user 102-2, identified by the identifier 182-1, has not been granted access authorization.

Figure 9:
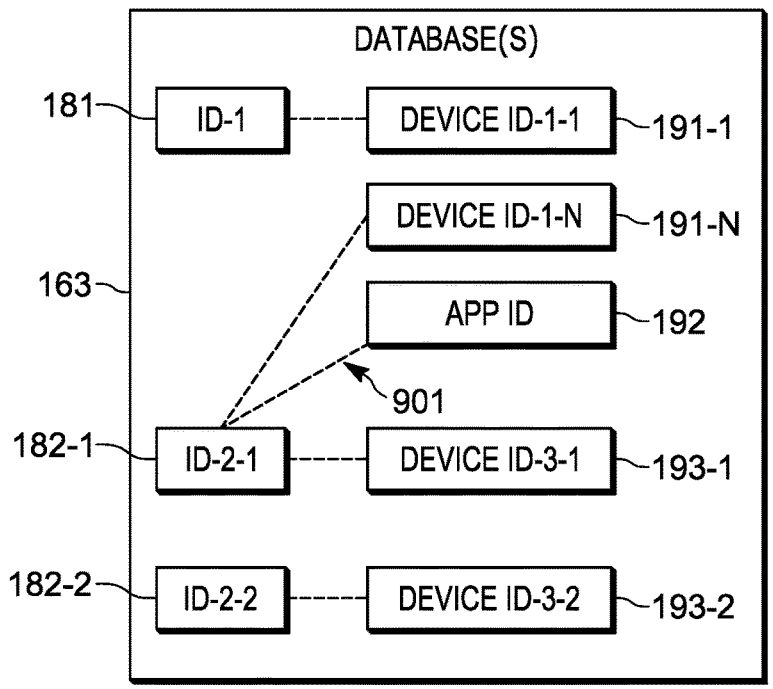
FIG. 9 depicts an access authorization of a subset of devices of a user, the access authorization of the subset fully transferred from the user to at least one other user in accordance with some alternative embodiments.

In an alternative example, in FIG. 9, the access authorization of a subset of the devices of the user 101 has been altered by fully transferring the access authorization of some of the devices of the user 101 to the user 102-1 as indicated by the dotted lines 901 between the identifier 182-1 and the identifiers 191-N, 192. The user 101 no longer has access to the devices and/or applications identified by the identifiers 191-N, 192, but maintains access to the device identified by the device identifier 191-1. The user 102-2, identified by the identifier 182-1, has not been granted access authorization.

Figure 10:
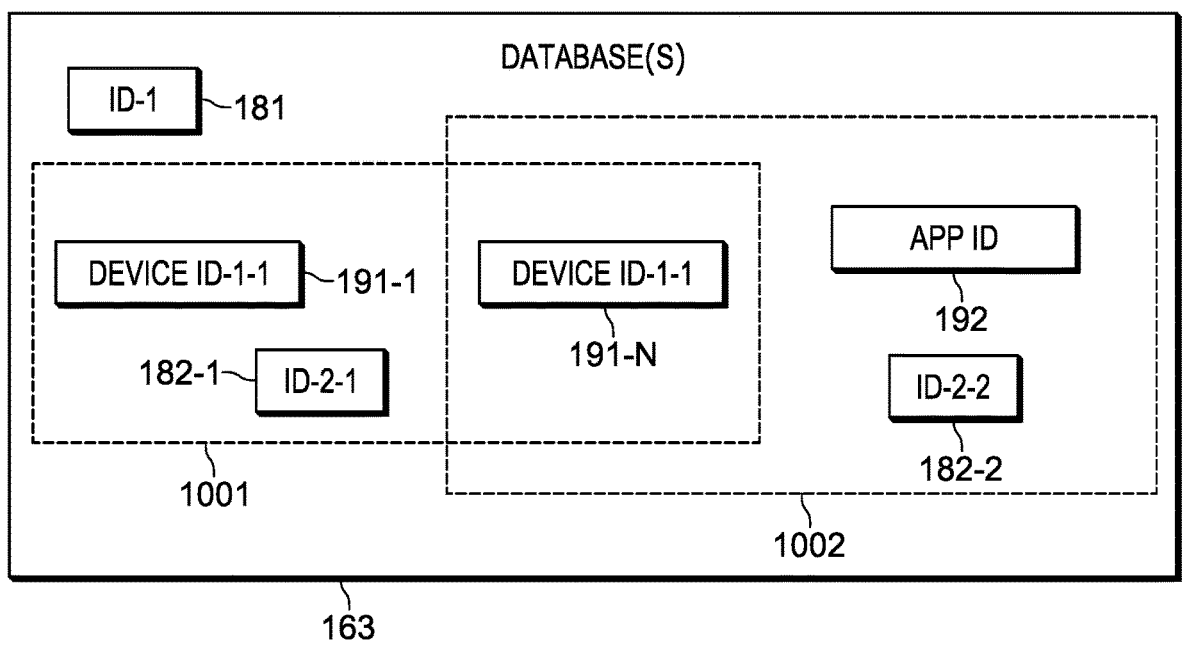
FIG. 10 depicts an access authorization of two subset of devices of a user, the access authorization of each of the subsets fully transferred from the user to two other users in accordance with some alternative embodiments.

With reference to FIG. 10, two subsets of the devices of the user 101 have been transferred to the users 102-1, 102-2. Access authorizations are depicted in FIG. 10 using boxes 1001, 1002 and furthermore associations between the users 102-1, 102-2 and the devices 103-1, 103-2 are not depicted for clarity, but are understood by one skilled in the art to be present. In FIG. 10, access authorization of a subset of the devices of the user 101 (e.g. identified by the identifiers 191-1, 191-N) has been fully transferred to the user 102-1, identified by the identifier 182-1; similarly, access authorization of a subset of the devices of the user 101 (e.g. identified by the identifiers 191-N, 192) has been fully transferred to the user 102-2, identified by the identifier 182-2. For example, the identifiers 182-1, 191-1, 191-N are inside the box 1001, and the identifiers 182-2, 191-N, 192 are inside the box 1002.

Figure 11:
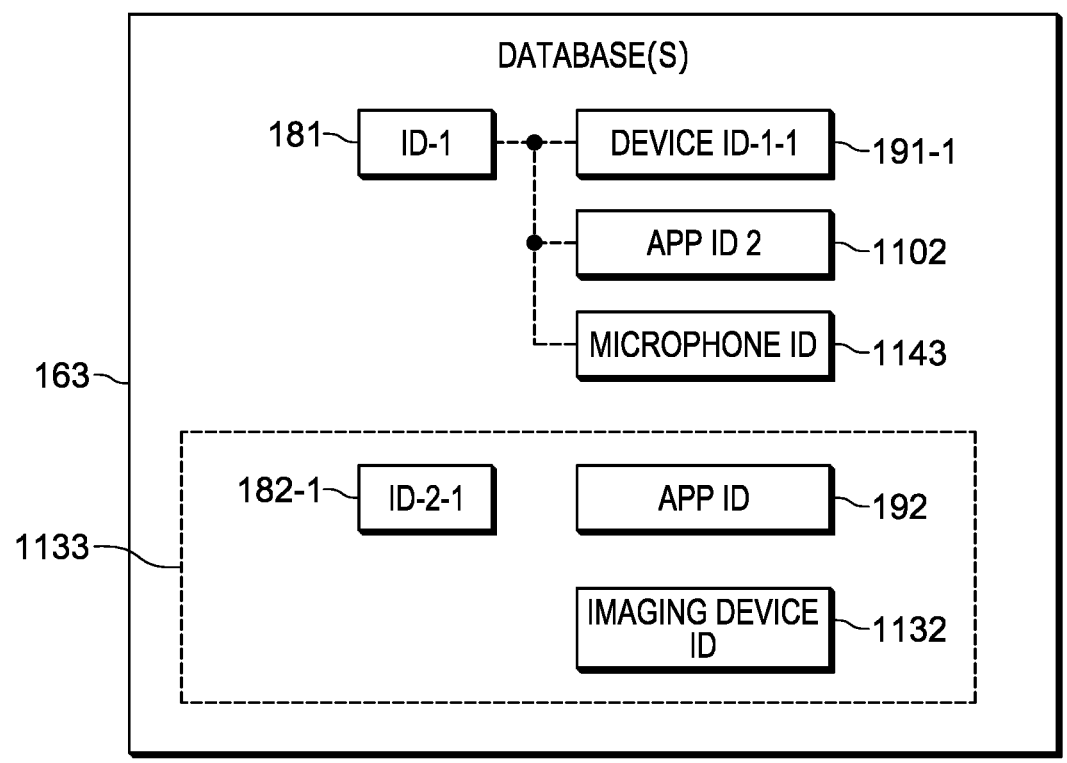
FIG. 11 depicts an access authorization of a subset of devices of a user, the subset of devices including a subset of a particular device of the user in accordance with some alternative embodiments.

In yet a further alternative example, in FIG. 11, the access authorization of a subset of one device identified by the identifier 191-1 (e.g. the device 300) of the user 101 has been altered by granting access to the user 102-1 (identified by the identifier 182-1) to the application (e.g. the application 324, identified by the application identifier 192) and an imaging device (e.g. the imaging device 333 identified by the identifier 1132), as indicated by the box 1133 around the identifiers 182-1, 192, 1132. The user 102-2, identified by the identifier 182-2, has not been granted access authorization, and associations between the users 102-1, 102-2 and the devices 103-1, 103-2 are not depicted for clarity, but are understood by one skilled in the art to be present.

In the example of FIG. 11, access to the application 324 and the imaging device 333 has been fully transferred to the user 102-1 identified by the identifier 182-1. However, the user 101 identified by the identifier 181 continues to have access to the remainder of the device identified by the identifier 191-1 including an application identified by the identifier 1102 and a microphone identified by the identifier 1143 (e.g. the microphone 333).

Hence, a user 102 may be granted access only to a subset of applications and/or components of one of the devices of the user 101. Furthermore, such granted access to a subset of applications and/or components of one of the devices of the user 101 may be augmented access (in which the access is augmented to include both the user 101 and the at least one other user 102) or fully transferred access (in which the access is fully transferred from the user 101 to the at least one other user 102).

Indeed, other types of access authorizations are within the scope of the present specification and it is understood that FIG. 7, FIG. 8, FIG. 9 and FIG. 10 represent only a portion of such access authorizations. For example, while the subsets of the devices of the user 101 to which access authorization is granted in FIG. 10 overlap, in other embodiments the subsets may not overlap.

Provided herein is a device, system and method for managing access authorizations of devices assigned to a user, such that the at least one other user is granted access to a subset of the one or more devices. The subset may include a portion of one device, including an application and/or a component of the one device, and/or more than once device. Such access is granted based on contextual conditions of the devices of the user. For example, the device, system and method provided may assist with granting access to the devices of a user when the user is "down" and/or incapacitated, for example in a public safety incident.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for managing access authorization, the method comprising:
   receiving, at one or more computing devices, a request to alter access authorization of one or more mobile devices assigned to a user, the request comprising data indicating a health-related contextual condition of the user that indicates that the user is incapacitated;
   determining, at the one or more computing devices, based on the data indicating the health-related contextual condition, that the user is incapacitated;
   determining, at the one or more computing devices, that the user, and at least one other user are assigned to a same incident;
   determining, at the one or more computing devices, that the at least one other user is at the location of the user;
   determining, at the one or more computing devices, based on the user being incapacitated, the user, and at least one other user being assigned to the same incident and the at least one other user being at the location of the user, a subset of the one or more mobile devices for which the access authorization is to be altered to include the at least one other user;
   altering, at the one or more computing devices, the access authorization of the subset of the one or more mobile devices to include the at least one other user, the access authorization comprising the at least one other user being granted access to the subset of the one or more mobile devices to access and use the subset of the one or more mobile devices;
   after the access authorization is altered, providing, by the one or more computing devices, login credentials of the at least one other user to the one or more mobile devices assigned to the user, such that the at least one other user uses the login credentials to log into the subset of the one or more mobile devices; and
   prior to altering, at the computing device, the access authorization of the subset of the one or more mobile devices to include the at least one other user, determining a role of the user and a respective role of the at least one other user,
   wherein altering the access authorization of the subset of the one or more mobile devices is based on whether the role of the user is relatively higher or lower than the respective role of the at least one other user, in an organizational hierarchy.

2. The method of claim 1, further comprising:
   altering, at the one or more computing devices, the access authorization of two or more subsets of the one or more mobile devices, such that two or more other users are granted access to a respective subset of the two or more subsets of the one or more mobile devices.

3. The method of claim 1, wherein the request to alter the access authorization of the one or more mobile devices assigned to the user is generated by one or more of:
   a device of the one or more mobile devices assigned to the user;
   a communication device associated with the at least one other user; and
   a computing device different from the one or more mobile devices and the communication device.

4. The method of claim 1, wherein altering the access authorization of the subset of the one or more mobile devices to include the at least one other user comprises one of:
   augmenting the access authorization of the subset of the one or more mobile devices to include both the user and the at least one other user; and
   fully transferring the access authorization of the subset of the one or more mobile devices from the user to the at least one other user.

5. The method of claim 1, wherein the subset of the one or more mobile devices comprises one or more of:
   a portion of one device of the one or more mobile devices;
   an application at the one device of the one or more mobile devices;
   one or more accessory devices associated with a hub device of the one or more mobile devices; and
   one or more personal access network devices associated with a hub device of the one or mobile more devices.

6. The method of claim 1, further comprising:
   transmitting, to a communication device associated with the at least one other user, at least one identifier of the subset of the one or more mobile devices to which the access authorization to the at least one other user has been granted.

7. The method of claim 1, wherein the determining, based on the user being incapacitated, the subset of the one or more mobile devices for which the access authorization is to be altered to include the at least one other user, at least partially comprises:
   transmitting, to a resource management computing device, a request for the access authorization; and
   receiving, from the resource management computing device, approval for granting the access authorization for at least a portion of the subset of the one or more mobile devices.

8. The method of claim 1, further comprising, when a contextual condition associated with the at least one other user, does not meet an approval condition:
   denying the access authorization.

9. The method of claim 1, further comprising:
determining, based on the user being incapacitated, and a contextual condition associated with the at least one other user, a second subset of the one or more mobile devices for which the access authorization is not be altered; and
excluding the second subset of the one or more mobile devices from the subset of the one or more mobile devices to which the at least one other user is granted access.

10. A computing device for managing access authorization, the computing device comprising:
a communication unit and a controller configured to:
receive, using the communication unit, a request to alter access authorization of one or more mobile devices assigned to a user, the request comprising data indicating a health-related contextual condition of the user that indicates that the user is incapacitated;
determine, based on the data indicating the health-related contextual condition, that the user is incapacitated;
determine that the user, and at least one other user are assigned to a same incident;
determine that the at least one other user is at the location of the user;
determine, based on the user being incapacitated, the user, and at least one other user being assigned to the same incident and the at least one other user being at the location of the user, a subset of the one or more mobile devices for which the access authorization is to be altered to include at least one other user, the user and the at least one other user currently assigned to a same incident;
alter the access authorization of the subset of the one or more mobile devices to include the at least one other user, the access authorization comprising the at least one other user being granted access to the subset of the one or more mobile devices to access and use the subset of the one or more mobile devices;
after the access authorization is altered, provide login credentials of the at least one other user to the one or more mobile devices assigned to the user, such that the at least one other user uses the login credentials to log into the subset of the one or more mobile devices; and
prior to altering the access authorization of the subset of the one or more mobile devices to include the at least one other user, determine a role of the user and a respective role of the at least one other user,
wherein altering the access authorization of the subset of the one or more mobile devices is based on whether the role of the user is relatively higher or lower than the respective role of the at least one other user, in an organizational hierarchy.

11. The computing device of claim 10, wherein the controller is further configured to: alter the access authorization of two or more subsets of the one or more mobile devices, such that two or more other users are granted access to a respective subset of the two or more subsets of the one or more mobile devices.

12. The computing device of claim 10, wherein the request to alter the access authorization of the one or more mobile devices assigned to the user is generated by one or more of:
a device of the one or more mobile devices assigned to the user;
a communication device associated with the at least one other user; and
a computing device different from the one or more mobile devices and the communication device.

13. The computing device of claim 10, wherein the controller is further configured to alter the access authorization of the subset of the one or more mobile devices to include the at least one other user by one of:
augmenting the access authorization of the subset of the one or more mobile devices to include both the user and the at least one other user; and
fully transferring the access authorization of the subset of the one or more mobile devices from the user to the at least one other user.

14. The computing device of claim 10, wherein the subset of the one or more mobile devices comprises one or more of:
a portion of one device of the one or more mobile devices;
an application at the one device of the one or more mobile devices;
one or more accessory devices associated with a hub device of the one or more mobile devices; and
one or more personal access network devices associated with a hub device of the one or more mobile devices.

15. The computing device of claim 10, wherein the controller is further configured to:
transmit, using the communication unit, to a communication device associated with the at least one other user, at least one identifier of the subset of the one or more mobile devices to which the access authorization to the at least one other user has been granted.

16. The computing device of claim 10, wherein the controller is further configured to determine, based on the user being incapacitated, the subset of the one or more mobile devices for which the access authorization is to be altered to include the at least one other user, at least partially by:
transmitting, using the communication unit, to a resource management computing device, a request for the access authorization; and
receiving, using the communication unit, from the resource management computing device, approval for granting the access authorization for at least a portion of the subset of the one or more mobile devices.

17. The computing device of claim 10, wherein the controller is further configured to, when a contextual condition associated with the at least one other user, does not meet an approval condition:
deny the access authorization.

18. The computing device of claim 10, wherein the controller is further configured to:
determine, based on the user being incapacitated, and a contextual condition associated with the at least one other user, a second subset of the one or more mobile devices for which the access authorization is not be altered; and
exclude the second subset of the one or more mobile devices from the subset of the one or more mobile devices to which the at least one other user is granted access.

* * * * *